(12) United States Patent
de Broqueville

(10) Patent No.: US 8,348,605 B2
(45) Date of Patent: Jan. 8, 2013

(54) DEVICE FOR DISCHARGING A FLUID THROUGH A ROTARY CHAMBER WITH INTERNAL CIRCULATION AND CENTRIFUGAL DELIVERY OF FLUIDIZED SOLID PARTICLES, AND PROCESSES USING THIS DEVICE

(75) Inventor: Axel de Broqueville, Grez-Doiceau (BE)

(73) Assignee: Axel de Broqueville, Grez-Doiceau (BE)

( * ) Notice: Subject to any disclaimer, the term of this patent is extended or adjusted under 35 U.S.C. 154(b) by 842 days.

(21) Appl. No.: 12/374,826

(22) PCT Filed: Jul. 24, 2007

(86) PCT No.: PCT/BE2007/000094
§ 371 (c)(1),
(2), (4) Date: Jan. 23, 2009

(87) PCT Pub. No.: WO2008/011689
PCT Pub. Date: Jan. 31, 2008

(65) Prior Publication Data
US 2009/0311092 A1    Dec. 17, 2009

(30) Foreign Application Priority Data

Jul. 25, 2006    (BE) .................................. 2006/0402

(51) Int. Cl.
*F04D 1/00*    (2006.01)
(52) U.S. Cl. ...................... 415/203; 415/121.2; 416/120; 416/181; 422/139

(58) Field of Classification Search .................. 208/409; 427/185, 215; 48/198.6; 415/203, 224, 109, 415/128, 121.2, 64; 416/120, 181, 199, 200 R, 416/213 R; 34/73, 576, 84, 303; 118/19, 118/83; 422/139, 140
See application file for complete search history.

(56) References Cited

U.S. PATENT DOCUMENTS

| | | | | |
|---|---|---|---|---|
| 5,273,656 | A * | 12/1993 | Anderson et al. | 210/635 |
| 6,233,843 | B1 * | 5/2001 | McKenzie et al. | 34/381 |
| 6,745,960 | B1 * | 6/2004 | Myo et al. | 241/5 |
| 7,797,854 | B2 * | 9/2010 | Huettlin | 34/73 |
| 2004/0168342 | A1 * | 9/2004 | Wakamatsu et al. | 34/576 |
| 2007/0234586 | A1 * | 10/2007 | Huettlin | 34/77 |
| 2008/0269432 | A1 * | 10/2008 | de Broqueville | 526/64 |
| 2009/0022632 | A1 * | 1/2009 | de Broqueville | 422/140 |
| 2009/0311092 | A1 * | 12/2009 | de Broqueville | 415/203 |
| 2010/0197879 | A1 * | 8/2010 | De Broqueville et al. | 526/348 |
| 2011/0243800 | A1 * | 10/2011 | Gallmetzer et al. | 422/146 |

* cited by examiner

*Primary Examiner* — Caridad Everhart

(57) ABSTRACT

Device for discharging a fluid (5) fed into a reaction chamber (1) containing solid particles fluidized by said fluid, through a rotary chamber (100) provided with a finned wheel (13) having fins (14), which may deliver into said reaction chamber the solid particles that are concentrated along the rotary circular wall (8) of said rotary chamber under the effect of the centrifugal force, and processes for the catalytic polymerization, combustion, gasification, drying, impregnation, coating or other treatments of solid particles in suspension in a fluid or for the cracking, dehydrogenation or other catalytic conversions of a fluid using this device.

15 Claims, 9 Drawing Sheets

DEVICE FOR DISCHARGING A FLUID THROUGH A ROTARY CHAMBER WITH INTERNAL CIRCULATION AND CENTRIFUGAL DELIVERY OF FLUIDIZED SOLID PARTICLES, AND PROCESSES USING THIS DEVICE

CROSS-REFERENCE TO RELATED APPLICATIONS

This application claims the benefit of PCT/BE2007/000094, filed Jul. 24, 2007, which claims priority from BE 2006/0402, filed Jul. 25, 2006.

TECHNICAL FIELD OF THE INVENTION

The present invention relates to a device for discharging one or more fluids, whether gaseous or liquid, fed into a reaction chamber containing solid particles fluidized by said fluid or fluids, through a rotary chamber provided with a finned wheel, making it possible to discharge into said reaction chamber the solid particles that have been entrained by the fluid inside said rotary chamber, and to catalytic polymerization, gasification, combustion, drying, impregnation or coating processes or to other treatments of solid particles suspended in a fluid, or to cracking or dehydrogenation processes or other catalytic conversions of fluids using this device.

TECHNICAL BACKGROUND OF THE INVENTION

To prevent solid particles suspended in a fluid from being discharged at the same time as the fluid, the centrifugal force is generally used, for example by means of cyclones or by making both the fluid and the solid particles rotate inside the chamber that contains them, which chamber may itself be rotary.

Generally speaking, since the rotation speed of the fluid and the solid particles is low, close to and along the fluid discharge tube, the smallest solid particles are driven to the inside of said discharge tube. To prevent solid particles from being so driven, a rotary duct may be used, such as that described in Patent Application PCT/EP2007/053941 filed by TOTAL PETROCHEMICALS RESEARCH FELUY, on 23, Apr. 2007, in the name of the same inventor. However, the vacuum, which is necessary for overcoming the centrifugal force generated by said rotary chamber and for sucking up and discharging the fluid through its openings inside the fixed central fluid discharge tube, may also suck up the fluid and the solid particles in suspension in this fluid through the generally narrow space between said rotary chamber and the walls of said fixed central fluid discharge tube.

SUMMARY OF THE INVENTION

The present invention comprises:
a device for feeding one or more fluids, whether gaseous or liquid, into a reaction chamber, hereafter called the main chamber, containing solid particles fluidized by said fluid or fluids;
a device for discharging said fluid or fluids through at least one tube, hereafter called the fixed central discharge tube, characterized in that this discharge device comprises:
a chamber that can rotate inside said main chamber, hereafter called the rotary chamber, bounded by a rotary circular wall surrounding a central axis, called the rotation axis, through which wall said fluid or fluids are discharged, said rotary chamber comprising:
a rotation device for rotating said rotary chamber about said rotation axis;
one or more inlet openings preferably located along one or both ends or between the two ends of its rotary circular wall or along one or both of its two lateral walls;
blades or guides enabling said fluid or fluids and the solid particles entrained by said fluid or fluids through said inlet openings to rotate inside said rotary chamber;
at least one central outlet opening, around said rotation axis, communicating with said fixed central discharge tube; and
one or more delivery openings along its rotary circular wall, these openings preferably being located on the opposite side from the side towards said inlet openings or on both sides or between said inlet openings, communicating with at least one finned wheel, which wheel is fastened around and on the outside of said rotary circular wall and which can, under the effect of the centrifugal force, deliver, from said rotary chamber into said main chamber, the solid particles that have been entrained inside said rotary chamber by said fluid or fluids and which accumulate along said rotary circular wall of said rotary chamber under the effect of the centrifugal force.

In the present invention, the solid particles fluidized by said fluid or fluids fed into said main chamber may be swirling and/or may form a conventional fluidized bed under the effect of gravity and/or a rotary bed under the effect of the centrifugal force. Said main chamber and said rotary chamber may contain various zones in which the solid particles may behave differently, for example sliding along certain walls, swirling in certain zones, forming a conventional fluidized bed under the influence of gravity and/or a rotary fluidized bed, under the influence of the centrifugal force, in other zones. The solid particles may also have very different sizes and therefore behave differently. The largest ones may slide along certain walls and the smallest ones may swirl in certain zones and concentrate along certain walls in other zones.

In the present invention, said fluid or fluids to be discharged may enter said rotary chamber via said inlet openings, entraining solid particles therein and may be sucked up out of said rotary chamber through said central outlet opening or openings via said fixed central discharge tube or tubes, which are connected to said discharge device. The centrifugal force generated by the rotation of said rotary circular wall concentrates said solid particles, which are entrained by said fluid or fluids inside said rotary chamber, along said rotary circular wall from which they can be sucked up through said delivery openings and delivered into said main chamber by the centrifugal force generated by the rotation of said finned wheel or wheels acting as a centrifugal compressor or pump.

According to various embodiments of the present invention, said inlet openings may be on one or both sides or in the middle part of said rotary chamber, the delivery openings being respectively on the other side, in the middle part or on both sides of said rotary chamber. The number of finned wheels may also be greater than 2, the inlet openings being located in the gaps separating the finned wheels.

According to one embodiment of the present invention, said fluid or fluids may be discharged via at least one fixed central discharge tube entering said rotary chamber on one or both sides of said finned wheel or wheels, said inlet openings being on the opposite side or between said finned wheels.

According to another embodiment of the present invention, said fluid or fluids may be discharged via at least one fixed central discharge tube entering said rotary chamber via one of its sides and separating, from said central outlet opening, said inlet opening or openings located on the same side, said finned wheel being on the opposite side.

According to another embodiment, the finned wheel may rotate about the middle part of said rotary chamber and said fluid or fluids may be discharged by at least one fixed central discharge tube entering said rotary chamber via one of its sides and via at least one other fixed central discharge tube entering said rotary chamber via the other side, said fixed central tubes separating said central outlet openings from said inlet openings located on each side of said rotary chamber.

In the present invention said central outlet opening or openings of said rotary chamber may be surrounded by one or more rotary discharge tubes fastened to said rotary chamber, these preferably being concentric with the end or ends of said fixed central discharge tube or tubes, surrounding or being surrounded by said end or ends.

According to one particular embodiment, said discharge device may be connected to at least two concentric fixed discharge tubes, the end of the inner tube entering more deeply into the rotary chamber through one of its sides, so as to allow separate discharge of fluid entering said rotary chamber via inlet openings further away on said side.

In the present invention, the finned wheel or wheels located on the ends of said rotary chamber are preferably parallel and close to one wall of said main chamber containing said fluid or fluids to be discharged.

According to one particular embodiment of the present invention, the rotary chamber may have, at each of its two ends, a finned wheel, these being preferably located close to two opposed sides of said main chamber and at least two central discharge openings, one on each side, facing or surrounding or surrounded by the end of at least two fixed central discharge tubes; at least one on each side, through which the fluid or fluids are discharged, the inlet openings being located between these two ends. According to one particular embodiment, said inlet openings are located on either side of a disc or of a rotary separating wall that divides the rotary chamber transversely into two parts. Said rotary separating wall may be extended to the outside of said rotary chamber and therefore enter into said main chamber so as to define two separate zones therein.

According to another particular embodiment of the present invention, the rotary chamber may have a central finned wheel located around the middle part of said rotary chamber and said inlet openings and central outlet openings located at each of the two ends of said rotary chamber, preferably close to two opposed sides of said main chamber, said inlet openings and central outlet openings being separated by the end of said fixed central discharge tubes entering, on each side, said rotary chamber. According to one particular embodiment, said central finned wheel is divided transversely by a disc or a rotary separating wall that also divides the rotary chamber into two parts. Said rotary separating wall may be extended to the outside of said rotary chamber and therefore enter said main chamber so as to define two separate zones therein.

In the present invention, the term "finned wheel" should be taken in the widest sense. It relates to a rotary circular device:
  which can rotate about the rotation axis of the rotary chamber and which comprises
  fins or walls defining free spaces or passages connecting the delivery openings of said rotary chamber to said main chamber, said free spaces or passages having a substantially radial direction and their outer end being outside said rotary chamber;
  a wheel or a rotary circular device connecting said fins or walls together.

Thus, the finned wheel generally comprises one or two annular discs to which fins are fastened. The annular disc or discs may have a flared shape and the fins may have a variable width and be straight or curved so as to modify the longitudinal direction and the radial direction and the cross section of the passages between the fins and along or between the annular discs. The thickness of the fins may be constant or may change progressively. For example, they may widen upon going away from the centre, as illustrated by FIG. 10.

By extension, the term "finned wheel" in the description of the present invention may also relate to simple rotary tubes, one end of which is fastened to the rotary circular wall around the delivery openings and the other end enters the main chamber outside the rotary chamber. Said simple rotary tubes may be straight or curved, with a cross section that may vary and with any shape, for example round or rectangular. The free spaces inside the tubes are passages via which solid particles and a fluid may be delivered by the centrifugal force of the rotary chamber into the main chamber. In the present invention, these said simple rotary tubes that are fastened to the rotary circular wall do not necessarily have to be connected together by an annular disc in order to be likened to a finned wheel.

In the present invention, said fixed central discharge tube or tubes and/or said rotary discharge tube or tubes may have a flared or doubly flared shape.

In the present invention, said rotary circular wall may have a cylindrical shape, but it may also have variable, preferably periodic, curvatures such as a corrugated surface, or may be polygonal. Its shape may be flared or domed, the widest part preferably being located on one or both sides of said finned wheel or wheels so as to make it easier for the solid particles to slide towards said delivery openings and/or to reduce the volume occupied by said rotary chamber inside said main chamber. In one particular embodiment of the present invention, the widest part may also be on the side of said inlet opening or openings.

The term "circular wall" is therefore employed here in the widest sense of a wall having any shape, closed on itself, surrounding a central axis, which is preferably an axis of symmetry. This wall may contain openings and be discontinuous in places, for example a succession of blades. It defines a volume or a chamber, the lateral sides of which may be open or closed by lateral walls that may contain openings.

The term "rotary" relating to said circular walls or volumes bounded by said circular walls means here "able to rotate about said central axis, also called the rotation axis".

In the present invention, since the outside diameter of the finned wheel or wheels is larger than the largest diameter of the rotary chamber, the pressure difference generated by the rotation of this or these finned wheels is preferably sufficient to enable the fluid to be delivered into said main chamber, which fluid is in the preferably narrow space or spaces located between the rotary wall or walls surrounding said central discharge opening or openings and the end or ends of said fixed central discharge tube or tubes and/or the fixed wall or walls that surround it or them. This delivery prevents the solid particles from being sucked up and discharged via this or these spaces into said fixed central discharge tube or tubes, while still delivering into said main chamber the solid particles entrained by the fluid in the rotary chamber through the inlet openings. This therefore makes it possible to substantially reduce the entrainment, and therefore the loss, of solid particles through the fixed central tube or tubes for discharging the fluid or fluids. It also makes it possible to obtain a longitudinal flow of the fluid and of the solid particles going from the inlet openings to the delivery openings inside the rotary chamber and in the opposite direction in the main chamber.

In the present invention, the amount of fluid that is delivered and the quality of the separation between the discharged fluid and the solid particles increase with the rotation speed of the rotary chamber and the outside diameter of said finned wheel or wheels. Said amount of fluid and said quality of the separation decrease when the pressure difference between the main chamber and the rotary chamber increases and therefore when the flowrate of the fluid to be discharged increases. They also depend on the dimensions, the position and the shape of the inlet openings and on the characteristics of the fluid and of the solid particles in suspension.

In the present invention, the inlet openings may be surrounded by blades that guide the fluid inside the rotary chamber, while still at least partially repelling the solid particles that are entrained by the fluid, so as to reduce the concentration of the solid particles in the fluid that enters inside the rotary chamber. However, it is necessary for the underpressure generated by these blades to be less than the underpressure generated by said finned wheel, generally located at the other end of the rotary chamber, so as to allow the latter to suck up and deliver into the main chamber some of the fluid that has entered the rotary chamber between said blades. For this reason, the outside diameter of said blades must be smaller, preferably 75% smaller, than that of said fins.

According to one particular embodiment of the present invention, the orientation and the shape of said blades favour entry of the fluid into said rotary chamber, thereby reducing the pressure difference between the main chamber and the rotary chamber, and may even reverse it, so as to increase the flow of fluid and therefore also the flow of the solid particles along the rotary circular wall and along the finned wheel.

According to another particular embodiment, the rotary lateral wall closing off the rotary chamber on the side towards said inlet openings surrounded by blades may be inside said rotary chamber and comprise inlet openings or passages in said rotary chamber. Said blades surrounding said inlet openings or passages may be on the outside of said rotary lateral wall, and inside the rotary circular wall. They may be bounded by a ring that is fastened along and inside said rotary circular wall.

According to one particular embodiment, said blades and said ring form a bladed wheel inside and bearing on the rotary circular wall and outside and bearing against the rotary lateral wall. This arrangement forces the fluid that enters into the rotary chamber, by passing between said blades, to follow a direction going from the centre to the outside, thereby enabling the blades to act as a centrifugal compressor or pump and therefore to substantially reduce, and even reverse, the pressure difference between the main chamber and the rotary chamber. This makes it possible to substantially increase the delivery of the fluid and of the solid particles and/or to reduce the outside diameter of said finned wheel, which may be close to the diameter of the rotary chamber.

According to one particular embodiment, said rotary lateral wall located inside said rotary chamber may be a rotary separating wall that separates said rotary chamber into two parts, namely a rotary reaction chamber located on the side towards the inlet openings, in which the fluid or fluids may react with the swirling solid particles, and a rotary separating chamber, located on the side towards the finned wheel and the fixed central discharge tube, where the fluid to be discharged is separated from the solid particles by the centrifugal force.

In the present invention, the centrifugal force may be one or more orders of magnitude greater than the gravitational force. The rotation axis of said rotary chamber may consequently have any orientation. It may be vertical, horizontal or inclined. Consequently, the meaning of the words "top" and "bottom" in the following descriptions relates to the figure described, without indicating the direction of the gravitational force, unless specifically mentioned.

In the present invention, the fluid discharged via said fixed central discharge tube or tubes generally rotates very rapidly. It may further contain solid particles that concentrate along its wall because of the centrifugal force and which may be recovered in a coaxial annular chamber acting as cyclone. The rotational energy of the fluid may also be partially recovered by means of the fins fixed to the inside of said fixed tube end converting the rotation speed into axial speed and/or into pressure.

In the present invention, the fluid discharged via said fixed central discharge tube or tubes may actuate a centrifugal impeller fastened to a driveshaft running along the rotation axis and driving the rotary circular wall. The same driveshaft may be connected to a centrifugal compressor or pump forming part of the fluid feed device in the main chamber.

In the present invention, the main chamber may be bounded by a fixed circular wall that surrounds the rotary circular wall. This fixed circular wall may be of any shape, preferably with an axis of symmetry identical to or parallel with the rotation axis of the rotary chamber. In one particular embodiment, this fixed circular wall may be cylindrical or polygonal and relatively close to the rotary circular wall. The fluid and the solid particles delivered into the main chamber by the finned wheel and possibly by the blades surrounding said inlet openings cause both the fluid and the solid particles contained in the main chamber to rotate. The solid particles, under the effect of the centrifugal force, concentrate along its fixed circular wall. The latter may be provided with a fluid feed device that feeds the fluid in mainly radial directions so as to reduce this concentration, by at least partially compensating for the centrifugal force and by slowing down the rotation speed of these solid particles. The fluid feed directions may have axial and/or tangential components so as to guide the solid particles in the desired direction and/or further increase or reduce the rotation speed of these particles.

In the present invention, if the fluid is a liquid, the main chamber containing this liquid may not be full. It is sufficient for the rotary chamber to be beneath the surface of the liquid in order to allow the solid particles accompanied by liquid to be delivered by the finned wheel.

According to one particular embodiment, the present invention may include a hollow central rotary tube, which serves as hollow driveshaft between the rotary circular wall and the device enabling it to rotate, through which a fluid, which may for example serve as a coolant, may be introduced between the two walls of the rotary chamber or through hollow rotary spokes and finally injected into the main chamber or the rotary chamber or discharged via the other end of said hollow driveshaft.

According to another particular embodiment, said hollow driveshaft may allow solid particles to be introduced into the rotary chamber or, when said fluid or fluid mixture is a gas, it may spray fine droplets of a liquid inside the rotary chamber or the main chamber.

According to another particular embodiment, solid particles may be introduced directly into the rotary chamber by means of fixed tubes which pass through the main chamber and the end of which faces the inlet openings of said rotary chamber.

Said rotary chamber may also be divided into several rotary chambers by one or more rotary separating walls comprising passages along the rotary circular wall enabling the fluid and the solid particles to pass from one chamber to another, said several rotary chambers comprising:

one or more rotary reaction chambers, located on the side towards said inlet openings, in which the fine droplets of a liquid or the solid particles introduced via the hollow driveshaft or facing the inlet openings may react with the fluid and/or with the solid particles contained in the fluid coming from the main chamber; and one or more rotary separating chambers, located on the side towards the delivery openings and towards the discharge opening or openings, into which the fluid or fluid mixture discharged into the fixed central discharge tube is separated from the fluid or fluid mixture and the solid particles that are delivered by the finned wheel or wheels into said main chamber.

Said passages may comprise guides that guide the fluid and the solid particles in the rotation direction so as to increase their tangential velocity and therefore the centrifugal force, so as to improve the separation between the discharged fluid or fluids and the delivered solid particles.

Said separating chamber or chambers may include deflectors that improve the separation between the discharged fluid or fluids and the delivered solid particles.

According to one particular embodiment of the invention, said rotary chamber, bounded by a rotary circular wall surrounding and able to rotate about a rotation axis, comprises:

at least one finned wheel fastened around and outside one end of said rotary circular wall;

a rotary separating wall that divides said rotary chamber into two parts connected by one or more passages along said rotary circular wall;

at least one inner/bladed wheel fastened along said rotary separating wall, inside and on the side towards the other end of said rotary circular wall, said inner wheel comprising an annular disc or ring, the outer edge of which is fastened to the inner surface of said rotary circular wall;

and the fluid discharge device comprises at least one fixed central discharge tube entering or facing the central outlet opening of said rotary chamber on the side towards said finned wheel.

According to one particular embodiment, said fluid discharge device also comprises a fixed central discharge tube penetrating or facing the central outlet opening of said rotary chamber on the side towards said other end of said rotary circular wall.

According to one particular embodiment, at least one of the lateral sides of said rotary chamber is not closed off by a rotary lateral wall, this or these lateral walls being open. According to one particular embodiment, the device for feeding solid particles and/or fluid comprises at least one fixed feed tube facing or entering through one of said open lateral sides of said rotary chamber.

In the present invention, the fluid or fluids discharged may be suitably treated, for example heated or cooled, and recycled into chosen zones of the main chamber or of the rotary chamber. A device for feeding and discharging solid particles may also allow the discharged solid particles to be suitably treated, for example regenerated and recycled into chosen zones of the main chamber or of the rotary chamber.

The present invention may be installed in existing industrial units, for example as a replacement for internal cyclones in a conventional fluidized-bed reaction chamber, in order to improve the separation between the discharged fluid and the solid particles, and therefore to allow the use of smaller solid particles or particles of various sizes, with a higher concentration and/or to increase the flowrate of the fluid. It also improves the circulation and agitation of the solid particles inside the reaction chamber. It also makes it possible to work with lower fluid flow-rates in so far as the fluid delivered and therefore recycled into the reaction chamber may help to fluidize the solid particles.

The present invention is particularly useful for processes requiring a high fluid flowrate and/or involving solid particles having very different dimensions and/or very small solid particles (microparticles or nanoparticles). It is also particularly suitable for processes requiring a high flow of solid particles and a low fluid flowrate. It may be used advantageously in processes for the drying, impregnation and coating of powders, for the combustion or gasification of solid particles and for the polymerization of very active small catalytic particles, since it allows a high concentration and agitation of the solid particles, with the reintroduction of the smallest particles into the main chamber without it being necessary to entrain or even fluidize the largest ones. It is also suitable for the catalytic conversion of fluids requiring good contact followed by good separation between fluid and catalytic particles, a short residence time of the fluid, and good circulation and agitation of the catalytic particles, which may be continuously regenerated.

DETAILED DESCRIPTION

Figure 1:
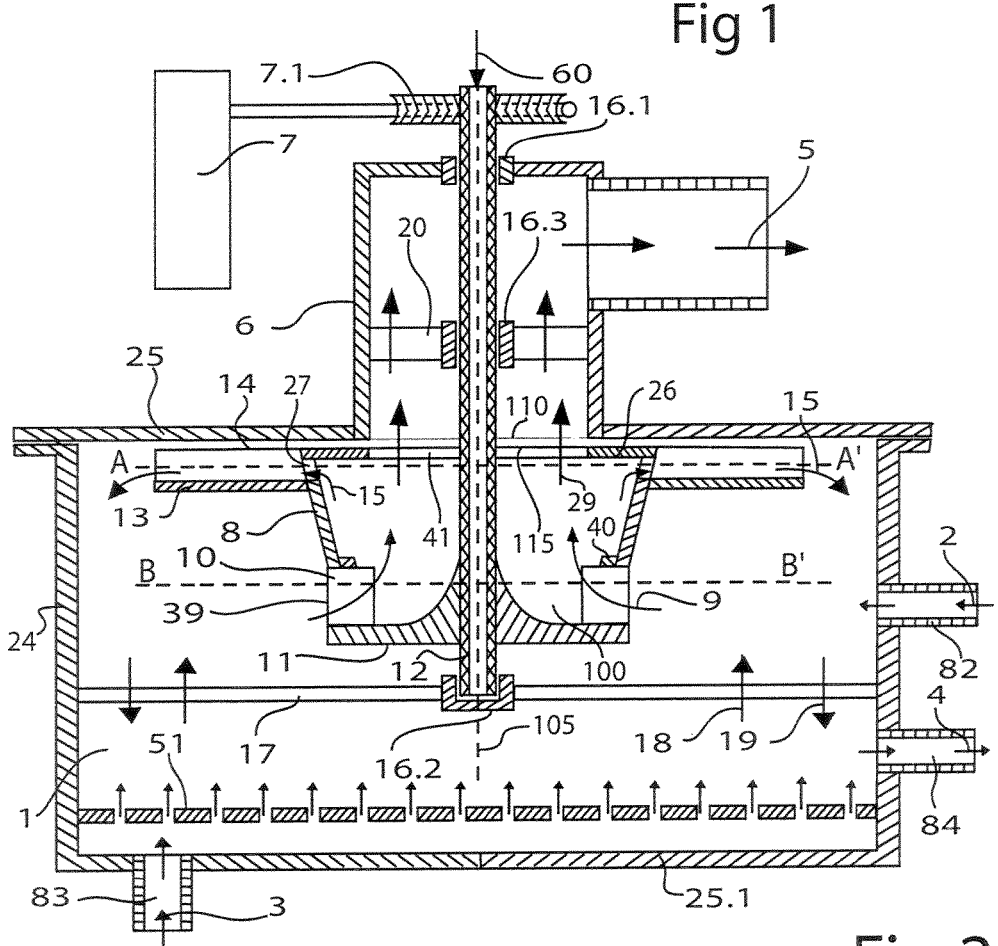
FIG. 1 is a schematic view of a longitudinal section of an example of a rotary chamber with centrifugal delivery.

According to one particular embodiment of the invention, the device for discharging one or more fluids, whether gaseous or liquid, fed into a main chamber containing solid particles fluidized by said fluid or fluids, is characterized in that it comprises:
  inside the main chamber, a rotary chamber, which is bounded by a rotary circular wall, surrounding and being able to rotate about a rotation axis and closed off by two rotary lateral walls;
  a rotation device for rotating said rotary circular wall, preferably comprising a driveshaft running along said rotation axis;
  one or more inlet openings along one end of said rotary circular wall, enabling said fluid or fluids to enter said rotary chamber;
  at least one central outlet opening through said rotary lateral wall located on the side towards the other end of said rotary circular wall, around said central axis, making it possible to discharge from said rotary chamber said fluid or fluids that have entered via said inlet openings into said rotary chamber;
  at least one fixed central discharge tube, the end of which surrounds said rotation axis and communicates with said central outlet opening of said rotary chamber;
  a finned wheel, which is fastened about and on the outside of said other end of said rotary circular wall; and
  one or more delivery openings along said other end of said rotary circular wall, enabling the fluid and the solid particles running along said rotary circular wall inside said rotary chamber to enter the space located between said fins and be delivered into said main chamber by the centrifugal force.

According to one particular embodiment, the end of said fixed central discharge tube and said central outlet opening are close to and face each other. According to another particular embodiment, the end of the fixed central discharge tube enters said rotary chamber through said central outlet opening.

According to another particular embodiment, said central outlet opening is surrounded by a rotary tube which is connected to said rotary circular wall by a rotary lateral wall or by spokes, said rotary tube surrounding or entering said fixed central discharge tube.

According to another particular embodiment of the invention, the device for discharging one or more fluids, whether gaseous or liquid, fed into a main chamber containing solid particles fluidized by said fluid or fluids, is characterized in that it comprises:
  inside the main chamber containing said fluid or fluids, a rotary chamber which is bounded by a rotary circular wall, surrounding and being able to rotate about a rotation axis;
  a rotation device for rotating said rotary circular wall, preferably comprising a driveshaft running along said rotation axis,
characterized in that it comprises:
  a device for discharging said fluid or fluids, comprising at least one fixed central discharge tube, the end of which surrounds said central axis and enters said rotary chamber through one of its open lateral sides;
  an inlet opening bounded by the circular space between said fixed central discharge tube and said rotary circular wall enabling said fluid or fluids to enter inside said rotary chamber;
  at least one central outlet opening bounded by the end of said fixed central discharge tube, enabling said fluid or fluids that have entered via said inlet opening into said rotary chamber to be discharged from said rotary chamber;
  a finned wheel, fastened around the other end of said rotary circular wall; and
  one or more delivery openings along said other end of said rotary circular wall, enabling the fluid and the solid particles running along said rotary circular wall inside said rotary chamber to enter the space located between said fins and to be delivered into said main chamber by the centrifugal force.

According to one particular embodiment, the lateral side of the rotary chamber, located on the side towards said finned wheel, is closed off by a rotary lateral wall. According to another particular embodiment, this lateral side is open and the finned wheel is parallel with and close to a fixed lateral wall of the main chamber. The rotary circular wall and the finned wheel may be connected to the rotation device by spokes, blades or other suitable means.

According to another particular embodiment of the invention, the device for discharging one or more fluids, whether gaseous or liquid, fed into a main chamber containing solid particles fluidized by said fluid or fluids, comprises:
  inside the main chamber containing said fluid or fluids, a rotary chamber, which is bounded by a rotary circular wall, surrounding and being able to rotate about a rotation axis and the lateral sides of which are open;
  a rotation device for rotating said rotary circular wall, preferably comprising a driveshaft running along said rotation axis, characterized in that it comprises:
- a finned wheel, fastened between the ends of said rotary circular wall, preferably along its middle part, around and on the outside of said rotary circular wall;
- one or more delivery openings along said rotary circular wall, enabling the fluid and the solid particles running along said rotary circular wall inside said rotary chamber to enter the space located between said fins and to be delivered into said main chamber by the centrifugal force;
- a device for discharging said fluid or fluids, comprising at least two fixed central discharge tubes, each entering said rotary chamber along said central axis through one of said open lateral sides;
- two inlet openings, each being bounded by the space between one of said fixed central discharge tubes and one of said ends of said rotary circular wall enabling said fluid or fluids to enter said rotary chamber; and
- at least two central outlet openings each bounded by the end of said fixed central discharge tubes entering said rotary chamber, enabling said fluid or fluids that have entered said rotary chamber via said inlet openings to be discharged from said rotary chamber.

According to another particular embodiment of the invention, the device for discharging one or more fluids, whether gaseous or liquid, fed into a main chamber containing solid particles fluidized by said fluid or fluids, comprises:
- inside the main chamber containing said fluid or fluids, a rotary chamber, which is bounded by a rotary circular wall, surrounding and being able to rotate about a rotation axis and two lateral sides that may be open or closed off by one or two rotary lateral walls;
- a rotation device for rotating said rotary circular wall, preferably comprising a driveshaft running along said rotation axis;
- one or more inlet openings located between the ends of said rotary circular wall, preferably along its middle part, enabling said fluid or fluids to enter said rotary chamber;
- at least two finned wheels, each fastened around a said end of said rotary circular wall;
- delivery openings along each of the ends of said rotary circular wall, enabling the fluid and the solid particles running along said rotary circular wall inside said rotary chamber to enter the space located between said fins and to be delivered into said main chamber by the centrifugal force;
- at least two opposed central outlet openings, each located through one of said rotary lateral walls or one of said open lateral sides of said rotary chamber around said central axis; and
- a device for discharging said fluid or fluids, comprising at least two fixed central discharge tubes, the end of each surrounding said central axis and communicating with one of said central outlet openings of said rotary chamber, enabling the fluid or fluids that have entered said rotary chamber via said inlet openings to be discharged from said rotary chamber.

According to one particular embodiment, the ends of said fixed central discharge tubes and of said central outlet openings are close to and face one another. According to another particular embodiment, one end of at least one of said fixed central discharge tubes enters said rotary chamber through at least one of said central outlet openings. According to another particular embodiment, at least one of said central outlet openings is surrounded by a rotary tube, connected to said rotary circular wall by a rotary lateral wall or by spokes, said rotary tube surrounding or entering one of said fixed central discharge tubes.

FIG. 1 is a schematic view of a longitudinal section of an example of a rotary chamber (100) with centrifugal delivery, in a main chamber (1), fed with one or more fluids (3), whether gaseous or liquid, containing or fed with solid particles (2) fluidized by said fluid or fluids, enabling the device and the operation of the present invention to be described.

The main chamber (1), of any shape, may for example be a tank of relatively large size or a reactor, which is generally fixed, bounded by a wall called the fixed circular wall (24), of any shape, which may for example be polygonal, elliptical or cylindrical, surrounding the rotary chamber (100). It may be closed off by walls called fixed lateral walls (25) and (25.1).

The main chamber (1) is supplied through a tube (83) by a device for feeding fluid (3) that can fluidize the solid particles contained in said main chamber, as illustrated in this example by a porous or perforated wall (51) placed along the fixed lateral wall (25.1), located in the bottom of the main chamber, enabling the solid particles to be suspended in a conventional fluidized bed. This fluid feed device may be placed elsewhere, for example along the fixed circular wall (24) and may be reduced to one or more simple fluid jets enabling the solid particles contained in said main chamber to be swirled or agitated.

The main chamber (1) may also be fed by a device for feeding solid particles (2), these being possibly entrained by a fluid, for example via the tube (82). It may also have a device for discharging solid particles (4), for example via the tube (84), preferably placed at the point where these solid particles can accumulate under the effect of the centrifugal force and/or gravity.

For example, if the shape of the fixed circular wall (24) surrounding the rotary chamber (100) is cylindrical, the solid particles delivered from the rotary chamber by the centrifugal force may concentrate along the fixed circular wall (24) by the centrifugal force. If the influence of gravity and/or of the size of the solid particles are sufficient, the solid particles delivered may also concentrate in the bottom of the main chamber (1), but in general, since the centrifugal force is preferably at least an order of magnitude greater than the gravitational force in the processes using this device, the movement of the solid particles is mainly influenced by the flow of fluids and the turbulence that they generate. In this case, the rotation axis (105) of the rotary chamber (100) may have any inclination, and the words "top" and "bottom" refer only to the position in the figure.

The rotary chamber (100), which can rotate about the rotation axis (105), is generally bounded by two rotary lateral walls (11) and (26), which pass through the rotation axis (105), and by a rotary circular wall (8), which wall is provided, along its surface on the side facing the rotary lateral wall (11), with inlet openings (10) via which the fluid (9) to be discharged can enter and, along its surface close to the opposed rotary lateral wall (26), with delivery openings (27) that open onto a finned wheel (13) having fins (14), which wheel is fastened to the outside of said rotary circular wall (8) and comprises for example an annular disc or ring (13) provided with fins (14), these being shown schematically by the rectangles (14), which may resemble the fins of a centrifugal compressor or pump. The annular disc may be flat or domed, whether concave or convex, and the fins may also be between two annular discs (13), which are parallel to each other or at a progressively varying distance apart, so as to influence the velocity of the fluid and of the solid particles that flow between the fins according to the objectives.

According to one particular embodiment of the invention, the inlet openings (10) may be surrounded or bounded by blades (39), shown schematically by the rectangles (39), which guide the fluid (9) and the solid particles entrained by the fluid (9) into the rotary chamber (100). In this example, the blades (39) may have a fin shape and are fastened to the rotary lateral wall (11) and to a ring (40) which is fastened along and on the inside of the rotary circular wall (8).

In this example, the rotary circular wall (8) has the shape of a slightly conical or flared tube so as to make it easier for the solid particles to slip along its inner surface and to increase the cross section of the rotary chamber (100) on the side towards the central outlet opening (115), which is also the side towards the finned wheel. The following figures show that the shape of the rotary circular wall may differ, and may also show the relative position of the inlet and outlet openings and of the finned wheel or wheels.

In this example, the rotary lateral wall (11) on the opposite side from the central outlet opening (115) is a closed disc bounded by the rotary circular wall. The following figures show by other examples that said rotary lateral wall may extend beyond the rotary chamber and/or be set back inside the rotary chamber and/or include inlet openings and/or be replaced, in FIG. 14, by spokes (42), or suitably inclined blades. It may even be completely open.

The other rotary lateral wall (26) is at the other end of the rotary circular wall (8). Other examples, illustrated by the following figures, show that it may extend along the fins (14) or be set back inside the rotary chamber and/or be replaced by rotary spokes or fins (41) or even be completely open.

A fixed central discharge tube (6), connected to a device for discharging the fluid (5), symbolized by an arrow (5), surrounds the rotation axis (105). In this example, the fixed central discharge tube (6) is fastened to a fixed lateral wall (25) of the main chamber (1), said wall being closely parallel to the finned wheel (13) having fins (14), and its end (110) closely faces the central outlet opening (115) of the rotary chamber (100).

Figure 5:
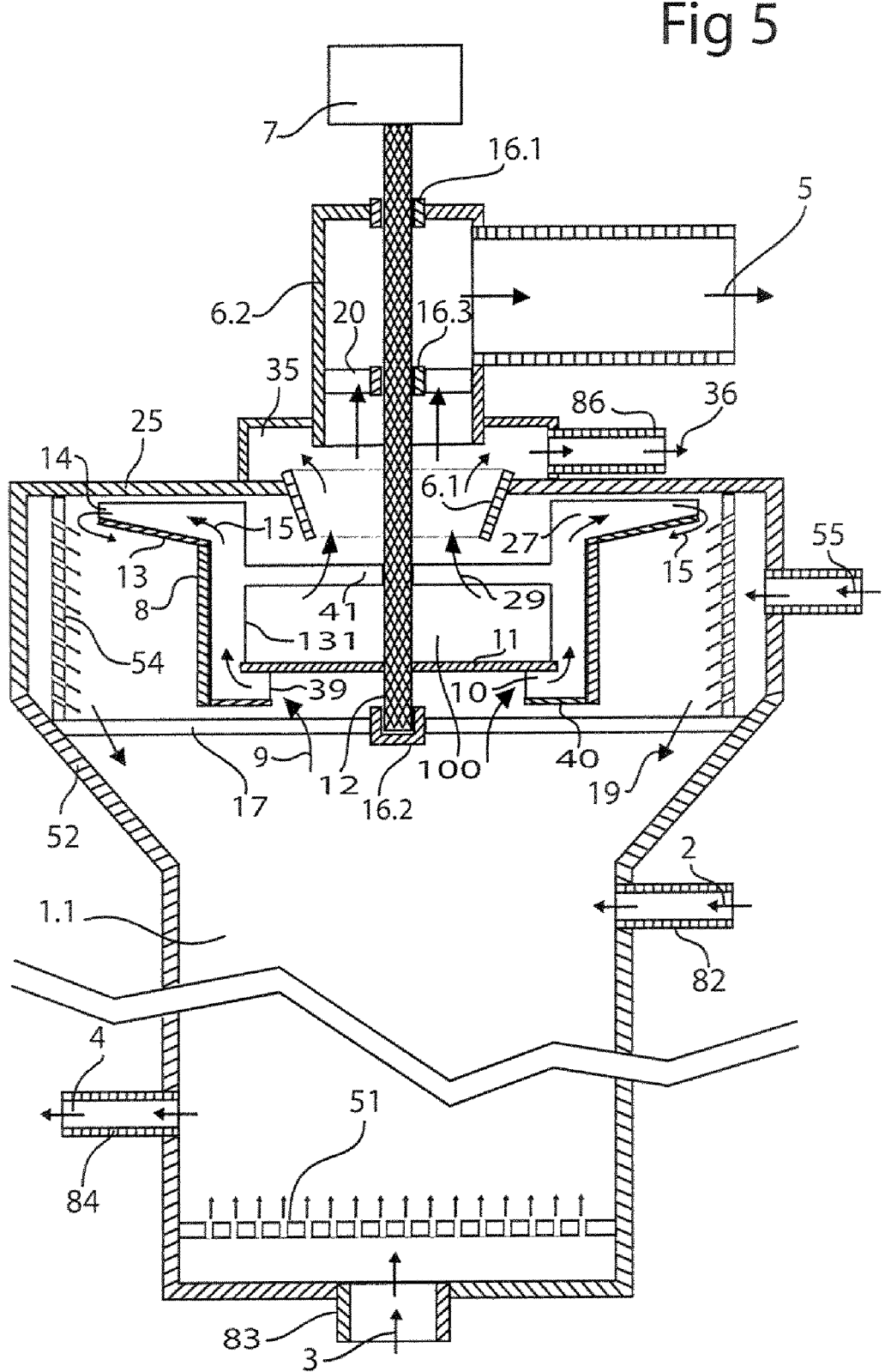
FIG. 5 is a schematic view of a longitudinal section of an example of a rotary chamber with centrifugal delivery inside a conventional fluidized-bed reactor with blades surrounding the inlet openings outside the rotary lateral wall and inside the rotary circular wall.
Figure 8:
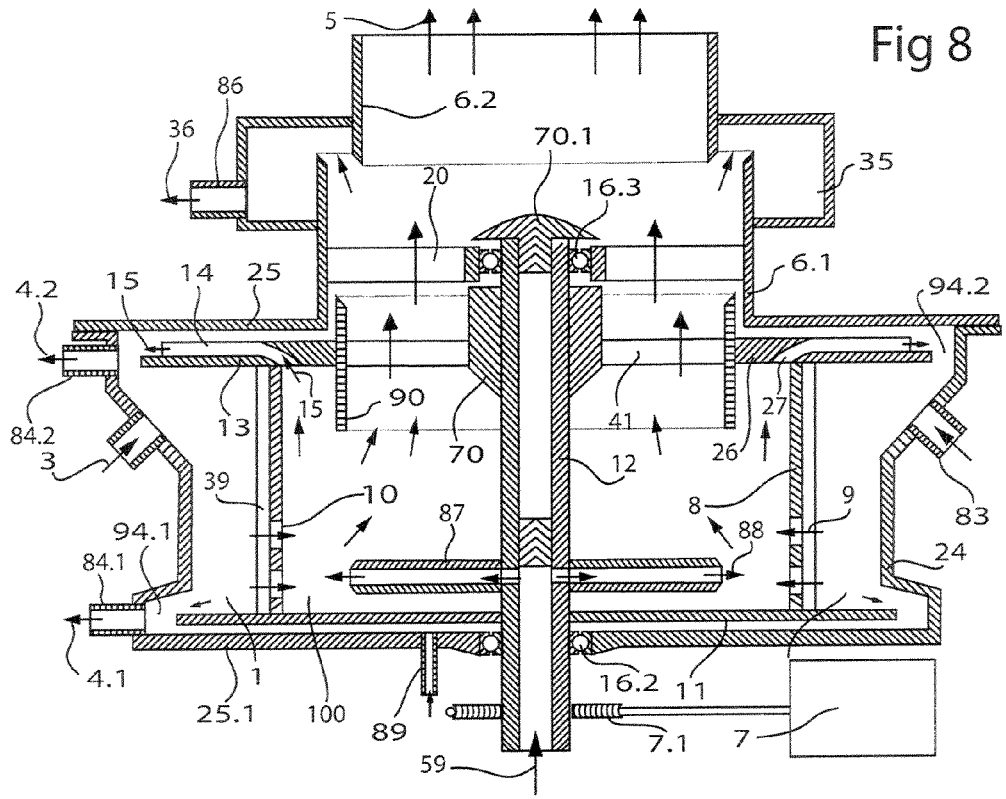
FIG. 8 is a schematic view of the longitudinal section of an example of a rotary chamber with centrifugal delivery, comprising a hollow driveshaft for feeding the solid particles into the rotary chamber.
Figure 16:
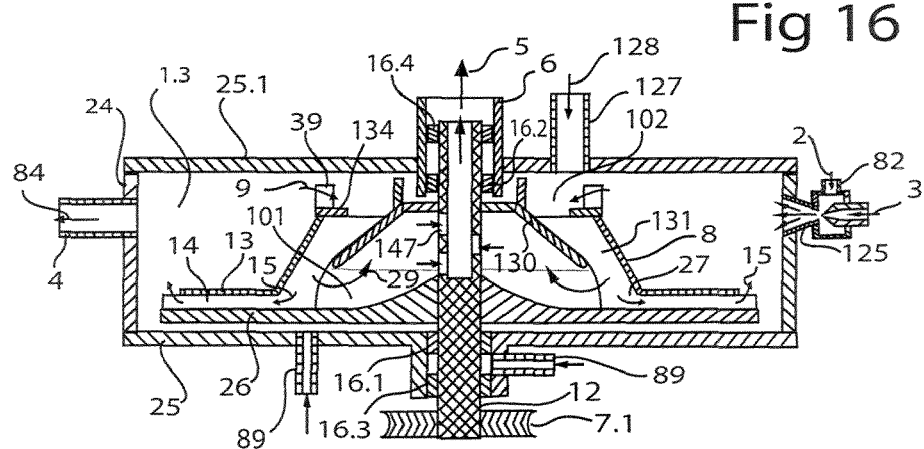
FIG. 16 is a longitudinal section of another example of a rotary chamber with centrifugal delivery, comprising a rotary separating wall (130) and in which the fluid is discharged via the hollow driveshaft that passes through the rotary chamber.

The fixed central discharge tube (6) may also enter the rotary chamber (100), like the fixed central discharge tube (6.1) of the example shown in FIG. 5, or the central outlet opening (115) may be bounded by a rotary tube entering or surrounding the fixed tube, as illustrated by FIGS. 8 and 16. This device may also comprise several fixed central concentric discharge tubes, the inner tube entering most deeply into the rotary chamber, and/or several concentric rotary tubes, the inner tube entering most deeply into the fixed tube or tubes, so as to better distribute the fluid flows passing through the various inlets and/or to discharge them separately. This particular embodiment is not illustrated by, a figure.

The rotary chamber (100) is connected to a device for rotating it. In this example, it is a driveshaft (12) that runs along the rotation axis (105). It is fastened to the lateral wall (11) and is actuated by a motor (7) via a pulley (7.1). Said driveshaft passes through the central outlet opening (115) and the fixed central discharge tube (6). Rotary spokes (41), shown schematically by the rectangles (41), placed along the central outlet opening (115), connect it to the rotary lateral wall (26) whilst letting through the discharged fluid (29), so as to increase the rigidity of the rotary chamber (100) and to reduce the possibility of vibration.

The driveshaft (12) is guided by supports, shown schematically by the guides or bearing bushes (16.1) to (16.3), which may comprise sealing membranes or packings and/or ball bearings. The support (16.2) is therefore on the centrifugal force or on the rotation speed, but also on the path that the fluid has to follow in this rotary chamber and therefore on the distances between the inlet, outlet and delivery openings and also on the presence of deflectors that improve this separation, as other examples below illustrate.

The amount of fluid delivered depends on the ratio of the suction force generated by the finned wheel or wheels to the pressure difference between the main chamber (1) and the rotary chamber generated by the device for discharging the fluid or fluids (5). If this pressure difference is relatively high, the amount of fluid delivered may be very small. In this case, some of the fluid to be discharged may enter the fixed discharge tube (6) without passing through the inlet openings and entrain solid particles therein, passing through the space between the finned wheel (13) and the fixed lateral wall (25).

Figure 14:
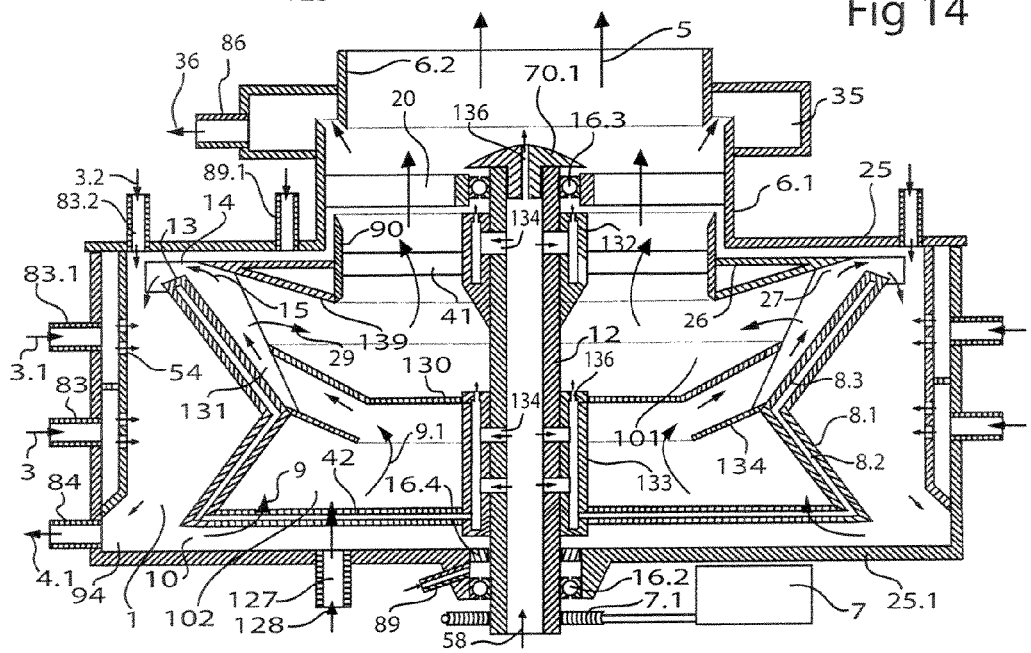
FIG. 14 is a schematic view of the longitudinal section of a rotary chamber with centrifugal delivery similar to that of FIG. 9 with solid particles fed via a fixed tube, fastened facing the inlet openings of a highly and doubly flared rotary chamber.
Figure 18:
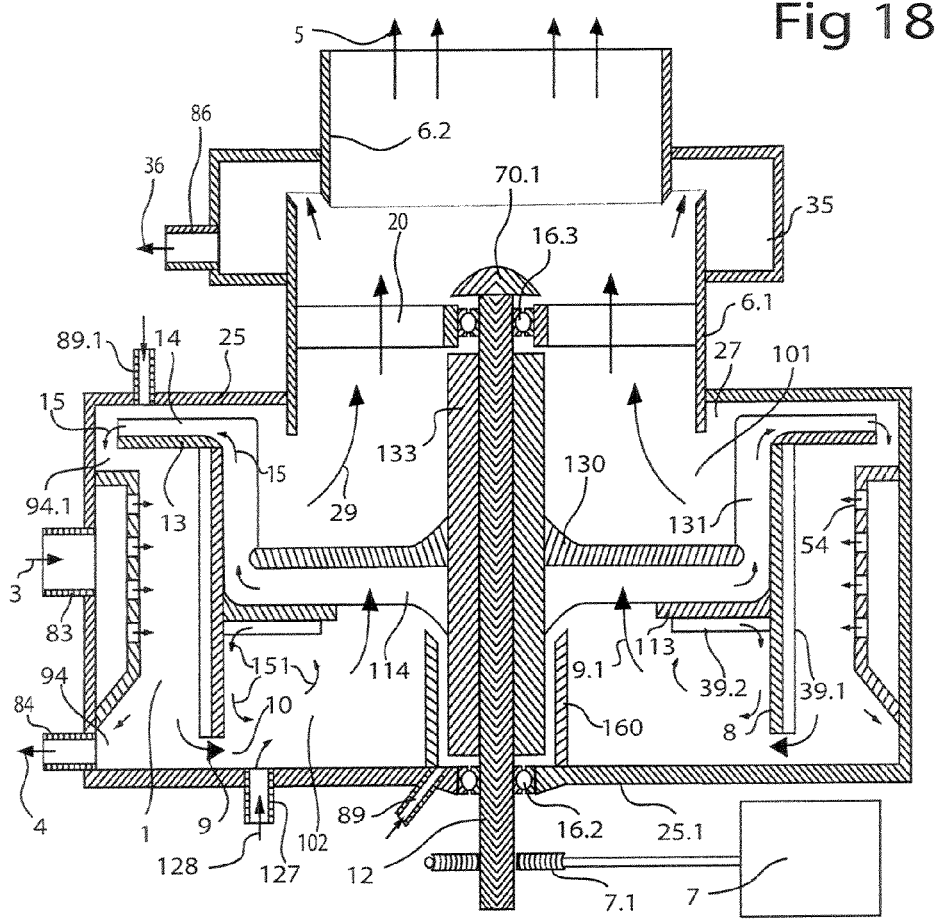
FIG. 18 is a schematic view of the longitudinal section of an example of a rotary chamber with centrifugal delivery, with a rotary separating wall (130) and an inner wheel (113) having blades (114) separating the rotary chamber into two parts (101) and (102).
Figure 19:
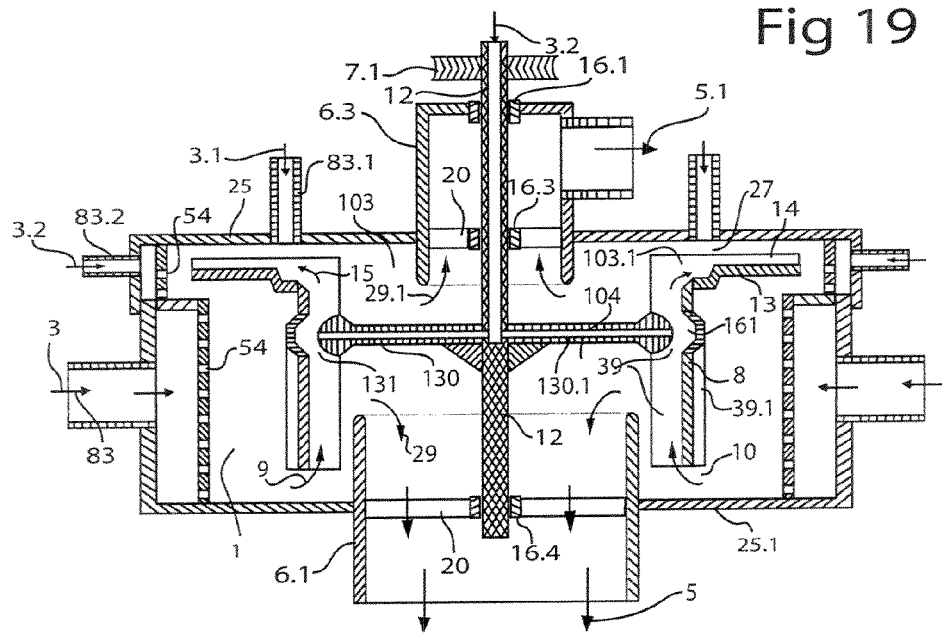
FIG. 19 is a schematic view of the longitudinal section of an example of a rotary chamber with centrifugal delivery divided by a rotary separating wall (130) into two parts (103) and (104), each part communicating with a fixed central discharge tube (6.1) and (6.3).

For some applications, a separating fluid may be fed in close to the finned wheel so as to reduce the amount of fluid delivered, without entraining a significant amount of solid particles into the fixed discharge tube, as illustrated by FIGS. 14, 18 and 19.

The suction force produced by the finned wheel depends mainly on the outside diameter of the fins, on their shape and on their rotation speed, but also on the difference in density between the delivered fluid (15), which generally contains a high concentration of solid particles, and the density of the incoming fluid (9), which depends on the difference in concentration of the solid particles and their relative density.

The pressure drop caused by the device for discharging the fluid or fluids (5) through the rotary chamber is, in general, mainly the pressure drop through the inlet openings (10). This depends on the flowrate of the fluid or fluids and on the size of the inlet openings (10), but also on the rotation speed as a function of the shape of these inlet openings.

For example, inlet openings surrounded by blades, the shape and orientation of which repel the solid particles, preventing them from entering the rotary chamber, will cause a higher pressure drop the higher the rotation speed. In this case, it is necessary to have a sufficiently high ratio of the outside diameter of the fins to that of said blades, preferably greater than 4/3, so that the suction force generated by the finned wheel is sufficient to be able to deliver the fluid and the solid particles into the main chamber.

However, although the shape and orientation of said blades facilitate the entry of the fluid and solid particles into the rotary chamber, the pressure drop decreases with the rotation speed and may even be negative. In this case, the amount of solid particles delivered into the main chamber, after having entered the rotary chamber, may be very high. This may increase the density of the fluid and of the solid particles (15) delivered into the finned wheel and therefore increase the delivery, without it being necessary to have a finned wheel with a diameter substantially larger than that of the rotary chamber and the blades that surround the inlet openings.

The rotation axis (105) may be horizontal, vertical or inclined. The main chamber (1) does not necessarily have to be closed. When the fluid is a liquid, said main chamber may for example be a tank or vessel without a lid. The support (16.2) is not essential and the spokes (17) may be connected to the fixed tube or to the fixed, lateral wall (25), which surrounds it, by a suitable armature.

Since the centrifugal force inside the rotary chamber may be very high, this device therefore makes it possible, for example, to discharge, from a main chamber containing fine solid particles, which are fluidized by one or more fluids fed in this chamber, said fluid or fluids without the solid particles, said particles being delivered into said chamber. The device also provides a continuous flow of the solid particles between the rotary chamber and the main chamber, said flow being relatively independent of the fluid discharge flowrate.

Figure 2:
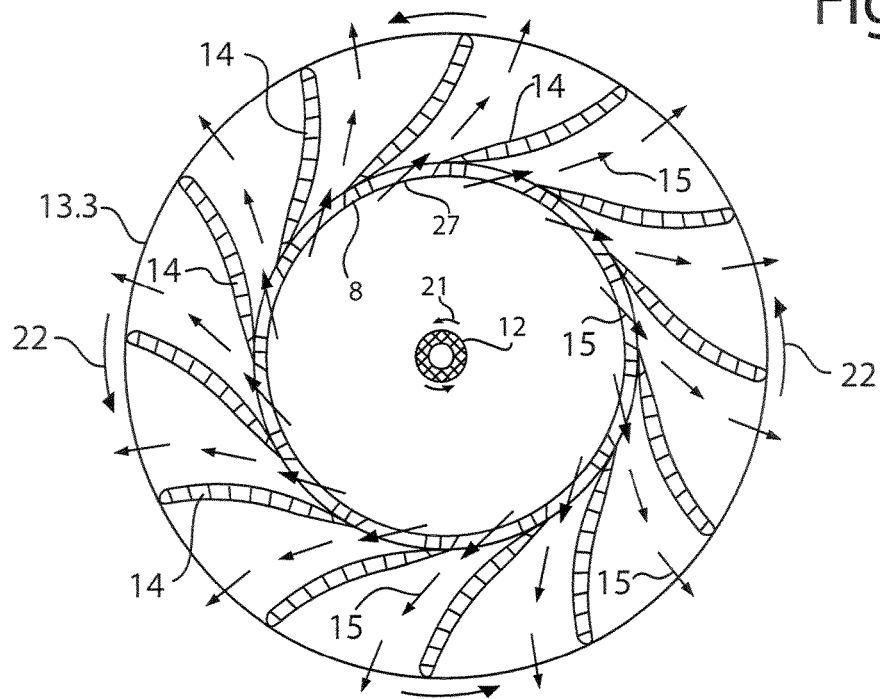
FIG. 2 is a schematic view of the cross section of an example of a finned wheel in the plane AA' of FIG. 1.

FIG. 2 is a schematic view of the cross section of an example of the wheel (13) having fins (14), in the plane AA' of FIG. 1. It shows the cross section of the rotary circular wall (8) having delivery openings (27), the cross section of the driveshaft (12), which is hollow in this example and the rotation speed of which is indicated by the arrows (21), the cross section of the fins (14) and the outer edge (13.3) of the ring (13), the rotation speed of which, being proportional to the radius, is indicated by the arrows (22). The solid particles and the fluid, which are entrained by the fins (14), are sucked in through the delivery openings (27) and delivered to the outside by the centrifugal force.

The ends of the fins (14) do not necessarily have to coincide with the edges of the rings (13). They may be shorter or longer. However, it is generally preferable for both the outside diameter of the fins and the rotation speed to be great enough so that the suction generated by the centrifugal force through the delivery openings (27) is greater than the suction generated by the device for discharging fluid (5) through the rotary discharge chamber (100).

Figure 3:
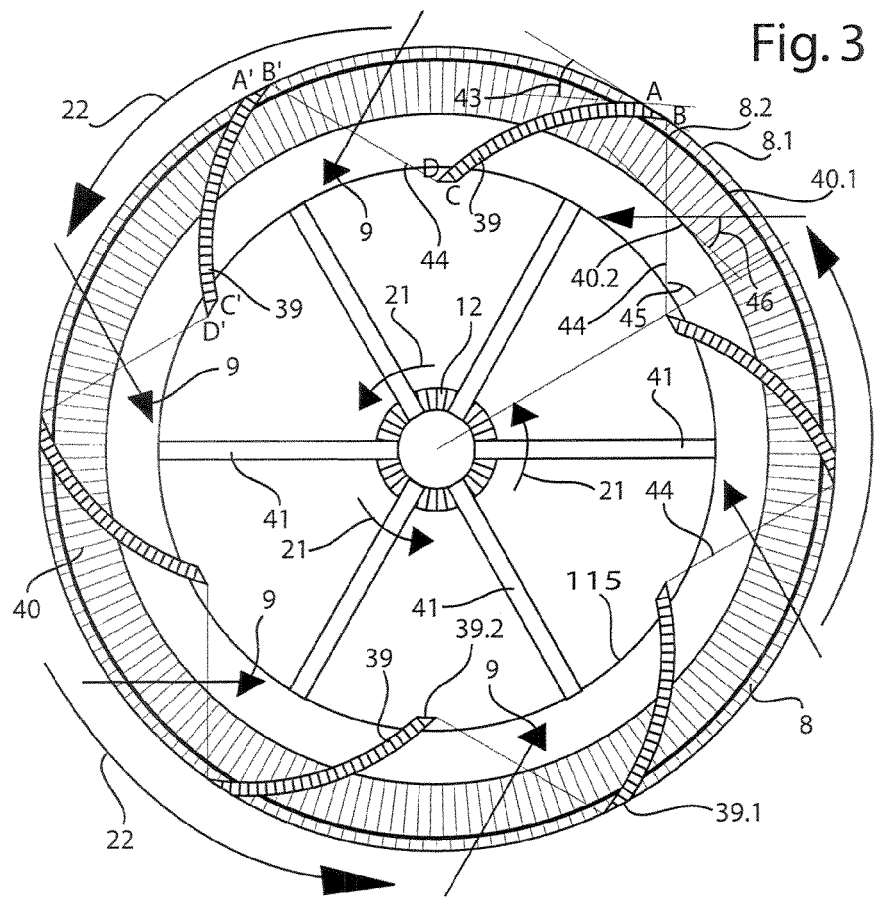
FIG. 3 is a schematic view of a cross section of a rotary chamber with centrifugal delivery in a plane cutting an example of blades surrounding the inlet openings.

FIG. 3 is a schematic view, from the bottom looking up, of the cross section of the rotary discharge chamber (100) of FIG. 1, in the plane BB', passing through an example having six blades (39). This figure distinguishes the following: the edge of the central outlet opening (115) located in the background; the outer edge (8.1) and the inner edge (8.2) of the rotary circular wall (8), which is cylindrical in this example and the direction of rotation and the rotation speed of which are shown symbolically by the arrows (22); the ring (40), the outer edge (40.1) of which coincides with the inner edge (8.2) of the rotary circular wall and its inner edge (40.2); in the foreground, the cross sections (39) of six blades, the outer ends AB, A'B', . . . or (39.1) of which have the same diameter as the outer edge (8.1) of the rotary tube (8) and the inner ends CD, C'D', . . . or (39.2) of which enter the rotary chamber beyond the inner edge (40.2) of the ring (40). In the background of the ring (40), the spokes (41) are fastened to the rotary circular wall (8) and to the driveshaft (12) which is hollow in this figure and the rotation speed of which, proportional to its radius, is shown symbolically by the arrows (21).

The outside diameter of the six blades (39) is, in this example, equal to the diameter of the rotary circular wall (8) and the inside diameter is smaller than the diameter of the ring (40). Their shape and their orientation relative to the direction of rotation enable the solid particles to be repelled. This is merely shown by way of example and is therefore not limiting.

If the angle of incidence (43) is defined as the angle made by the tangent to the blade at a given point, the point A in this example, and by the tangent to the circle passing through this point, they have angles of incidence that vary from one point to another. It is relatively small, in this example preferably less than 45°, at the outer end of the blades so that the solid particles can slide along and to the outside of the blades without being excessively accelerated, while still being repelled by said blades towards the fixed lateral circular wall of the reaction chamber.

To avoid offering too high an air resistance, in order for the reduction in pressure of the fluid (9) that has to enter the chamber by passing between the blades (39) to be lower than the centrifugal force generated by the finned wheel (13) on the solid particles and the fluid (15) that have to return to the reaction chamber, it is desirable for the number of blades (39) not to be too high, preferably fewer than that of the fins (14) and for the width of the inlet openings to be sufficiently large, depending on the desired fluid flowrate.

The inlet openings DB', . . . or (44) have an inclination (45) defined as the angle that they make with the radius passing through their inner end and the fluid (9) passes through the inlet opening with an average angle of incidence (46) close to the inclination (45) of the discharge opening (44). For a given difference between the inside and outside diameters of the blades and for a given flowrate of the fluid, the higher the angle of incidence (45) the greater the width of the opening and therefore the lower the input velocity of the fluid. The higher the angle of incidence (46), the smaller the tangential component of the penetration velocity of the fluid (9). To this is added the tangential rotation velocity of the blades, and therefore the centrifugal force exerted on the fluid increases.

Consequently, the centrifugal force exerted on the fluid (9) entering the rotary chamber (100) through the inlet openings (44) is therefore greater the smaller the inclination (45) of these openings (44). This improves the separation between the solid particles and the fluid, but it also increases the suction force or underpressure required for the fluid (9) to enter the rotary chamber and therefore requires the outside diameter of the finned wheel (14) to be increased so that the centrifugal force generated by this wheel is sufficient to compensate for this underpressure if it is necessary to prevent the fluid in the main chamber from entering the rotary chamber via the delivery openings, countercurrently, and therefore reduce the delivery of solid particles.

According to one particular embodiment of the invention, the inlet openings (44) are relatively narrow and their inclination (45) is small, so as to obtain a very high centrifugal force and therefore to repel most of the solid particles and therefore to prevent them from entering the rotary chamber. This requires finned wheels having an outside diameter substantially greater than the outside diameter of the blades (39) or of the rotary chamber.

According to another particular embodiment of the invention, the inlet openings (44) are relatively wide and their inclination (45) is large, so as to reduce the centrifugal force and therefore the pressure drop of the fluid entering the rotary chamber between the blades (39). However, as this allows a larger number of solid particles to enter the rotary chamber, it is necessary for the distance between the inlet openings and the central outlet opening to be long enough and for the rotation speed of the rotary chamber to be high enough to allow separation of the solid particles from the discharged fluid (29). This may be improved by the use of suitable deflectors, fastened to the inside of the rotary chamber. It is also necessary for the delivery openings and the fins (14) to be suitable for the highest flow of solid particles.

The choice of the embodiment, the shapes and the dimensions must be made according to the desired flowrate of the fluid, to the size of the solid particles that have to be repelled by the blades (39) or returned to the chamber via the finned wheel (14) and to the solid-particle flow objectives.

Figure 4:
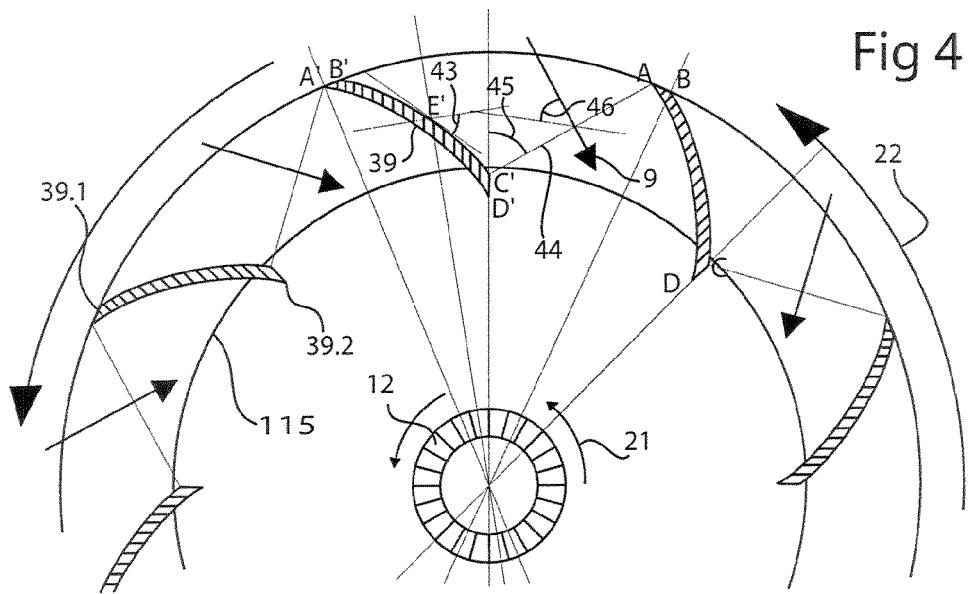
FIG. 4 is a schematic view of part of a cross section of another example of blades surrounding the inlet openings of a rotary chamber with centrifugal delivery.
Figure 9:
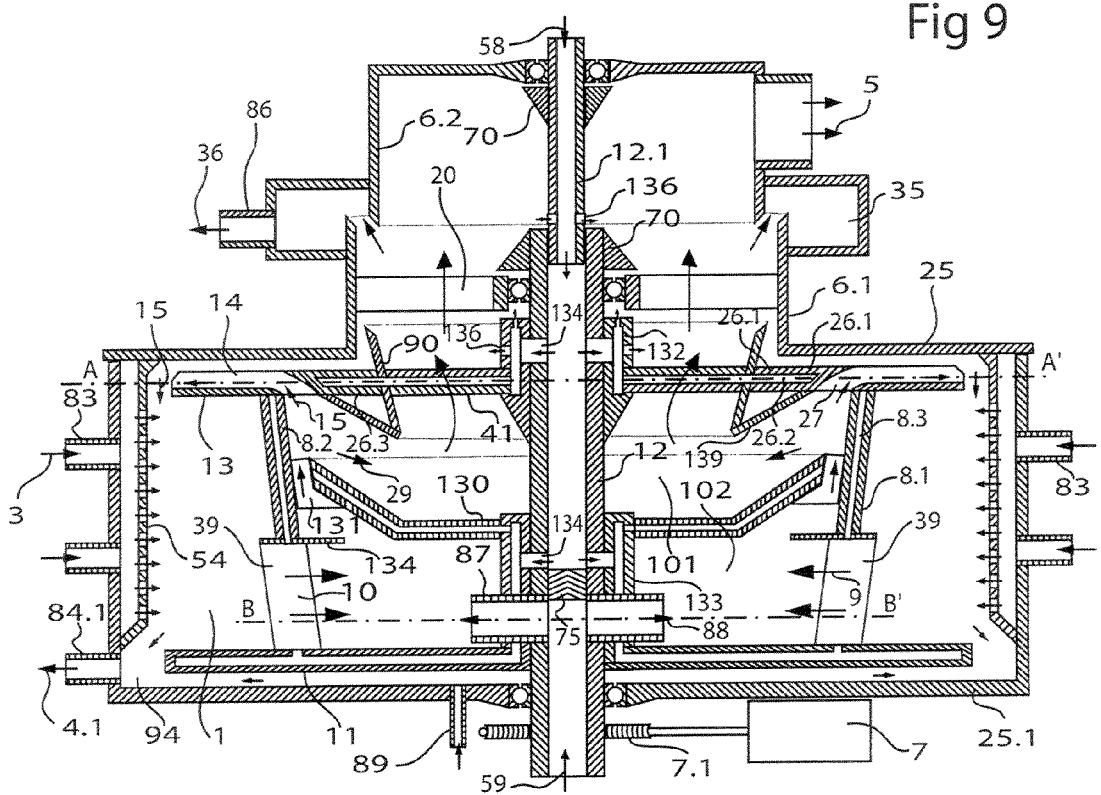
FIG. 9 is a schematic view of the longitudinal section of an example of a rotary chamber with centrifugal delivery, comprising two walls, one wall dividing the rotary chamber into two parts and a hollow driveshaft for feeding the solid particles into the rotary chamber and a coolant between the two walls.

According to another particular embodiment of the invention, the inlet openings (44) may be oriented in the direction opposite the direction of rotation of the rotary chamber so as to make it easier for the fluid and the solid particles to enter the rotary chamber and therefore to increase the flow of solid particles. One such example of blades is illustrated in FIG. 4. However, this device may require the use of deflectors or guides that may increase the rotational velocity of the fluid and of the solid particles inside the rotary chamber so as to ensure the separation of the fluid and the solid particles (15) delivered and the discharged fluid (29). Such an example is illustrated in FIG. 9.

FIG. 4 is a schematic view of part of a cross section of another example having eight blades, the orientation of which is opposite to the direction of rotation. The inlet openings AC', ... or (44) are oriented in the opposite direction to the direction of rotation of the rotary chamber. The tangential component of the entry velocity of the fluid (9) therefore reduces the tangential entry velocity of the fluid, therefore reducing both the centrifugal force and the pressure drop through these inlets. This therefore allows the amount of fluid delivered by the finned wheel to be increased.

The concentration of solid particles is higher along the inner edge of the blades. Since the density of the solid particles is higher than that of the fluid, the centrifugal force may again repel them towards the main chamber (1), but if the flowrate of the fluid is relatively high, a large amount of solid particles is entrained by the fluid (9) inside the rotary chamber, and therefore the amount of solid particles delivered into the main chamber (1) may be considerable. This type of blade therefore allows good flow of solid particles along the rotary circular wall to be achieved. This possibility is very useful for processes in which it is desirable to have good flow of the solid particles or to make these solid particles react with other solids or liquids fed into the rotary chamber.

According to another particular embodiment of the invention, the rotary circular wall is extended beyond the disc or beyond the rotary lateral wall (11), the diameter of which is smaller than the diameter of the rotary circular wall so as to obtain a passage that allows the fluid (9) to enter the rotary chamber, and the blades (39) are on the outside of the rotary lateral wall (11).

According to one particular embodiment, a ring (40) may be fastened along the end of the rotary circular wall located beyond the rotary lateral wall. In this case, the blades (39) may be located between the rotary lateral wall (11) and the ring (40) and may form, with this ring (40), a bladed wheel fastened to the inside and along the end of the rotary circular wall (8) and on the outside of the rotary lateral wall (11).

According to this arrangement, the fluid (9) that enters the rotary chamber, by passing between the blades (39), must necessarily follow a radial direction along the rotation axis (105) towards the rotary circular wall (8). Consequently, the blades (39) can function as the fins (14) of the finned wheel and act as a centrifugal compressor or pump which sucks up the fluid (9) in the rotary chamber (100).

This enables the pressure difference between the main chamber and the rotary chamber to be reduced, and even reversed, and therefore makes it possible to obtain a very high delivery or flow of solid particles, even if the diameter of the finned wheel and/or the flowrate of the fed and discharged fluid or fluids are relatively small. This configuration is also very favourable to separating the delivered fluid and solid particles (15) from the discharged fluid (29). Such an example is illustrated in FIG. 5.

FIG. 5 is a schematic view of a longitudinal section of an example of a rotary chamber (100) inserted in a conventional non-rotating fluidized-bed main chamber or reactor (1.1).

The rotary chamber (100), bounded by the rotary circular wall (8), of cylindrical shape in this example, is open on the side of the finned wheel (13) via which a fixed central discharge tube (6.1) of flared shape enters. On the other side, it is extended beyond the rotary lateral wall (11), the diameter of which is smaller than the diameter of the rotary circular wall (8) or which includes one or more passages for the fluid (9) along the rotary circular wall (8) and is terminated in a ring (40), the outer edge of which is fastened along and on the inside of the end of the rotary circular wall (8).

The space between the rotary lateral wall (11) and the ring (40) acts as an inlet opening (10) via which the fluid (9) can enter into the rotary chamber (100). The inlet opening (10) is surrounded by blades (39), shown schematically by the rectangles (39), which are fastened to the rotary lateral wall (11) and to the ring (40).

The wheel having fins (14), which is located on the open side of the rotary chamber (100), comprises a ring or annular disc (13) of flared shape, and the fins (14) rotate close to the fixed lateral wall (25) of the reactor (1.1). The space between the end of the rotary circular wall (8) and the fixed central tube (6.1) acts as delivery opening (27), and the central outlet opening (115) coincides with the end of the fixed central discharge tube (6.1) that separates the central outlet opening (115) from the delivery opening (27).

The rotary circular wall (8) is connected to the driveshaft (12), which is connected to the motor (7), via the rotary lateral wall (11) and the ring (40), these being connected together by the blades (39). It is also connected to the driveshaft via rotary spokes (41) which do not prevent passage of the fluid (29) to be discharged. In this example, the fins (14), the spokes (41) and the blades (39) are connected by guides (131), so as to form continuous smooth surfaces along which the solid particles can slide.

The fixed central discharge tube (6) is divided into two portions: the portion (6.1) which is flared and enters the rotary chamber (100), and the portion (6.2) separated from the portion (6.1) by a coaxial annular chamber (35), acting as external cyclone, making it possible, thanks to the centrifugal force that can be very high inside the fixed central discharge tube (6.1), to recover the solid particles (36) entrained in the fixed central discharge tube (6.1), for example due to a malfunction, and to discharge them via the tube (86).

The driveshaft is held in place inside the fixed tube by bearing bushes or packings (16.1) to (16.3) which may comprise ball bearings, these being fastened to the fixed tube (6.2) by fixed fins or spokes (20) and to the wall of the reactor (1.1) by the spokes (17). These bearing bushes or ball bearings may be protected from dust by suitable devices.

In conventional fluidized-bed reactors, the bottom of the reaction chamber (1.1), which in general is substantially higher than it is wide, comprises device (51), such as for example a porous or perforated or slotted wall, enabling a fluid (3) to be fed so as to fluidize the solid particles (2) introduced via the tube (82). The solid particles (4) may be discharged by the tube (84).

The reaction chamber (1.1) is generally flared (52) at the top, close to the fluid discharge device, generally comprising internal cyclones that are replaced by the rotary chamber (100), so as to separate the solid particles from the ascending fluid. However, if the flowrate of the fluid is high, which in general is desirable, a large amount of solid particles can be entrained by the fluid (9) which is sucked up by the device for discharging the fluid (5).

The rotation speed and the shape of the blades (39) causes said fluid (9), and the solid particles that it entrains, to rotate in the rotary chamber. The centrifugal force makes the solid particles slide along the rotary circular wall (8) and separates them from the fluid (29) which is sucked up through the fixed central discharge tube (6.1) by the device for discharging the fluid (5). The solid particles (15) are sucked up by the finned wheel (13) having fins (14) through the delivery openings (27) and are delivered, rotating, to the main chamber (1.1).

A large amount of solid particles may therefore accumulate along this wall because of the centrifugal force before going back down, under the effect of gravity, into the fluidized bed. A fluid feed device (54) such as a porous slotted or perforated wall may allow a secondary fluid (55) to be fed, so as to fluidize the solid particles and thus form, locally, a rotating fluidized bed, while still reducing their rotation speed along the wall. The feed direction may be oriented towards the bottom, so as to speed up the descent of these particles (19) towards the conventional main fluidized bed in the lower part of the reaction chamber (1.1).

In this particular embodiment of the invention, the blades (39) can push the fluid into the rotary chamber (100), thereby reducing, and even reversing, the pressure difference between the rotary chamber (100) and the main chamber (1.1). This enables the outside diameter of the fins (14) to be reduced or the diameter of the rotary circular wall (8) to be increased. Furthermore, the centrifugal force is essentially determined by the rotation speed of the rotary chamber independently of the entry velocity of the fluid (3). This ensures a good separation between the solid particles and the fluid almost independently of the flowrate of the fluid (3).

This device therefore helps to improve the separation between the solid particles and the fluid in existing fluidized-bed installations and therefore increases the flowrate of the fluid and/or the concentration of solid particles and/or enables smaller solid particles to be used. It also makes it possible to increase the flow of solid particles in the main chamber and inside the rotary chamber, even when the flowrate of the fluid to be discharged is low.

It may have an easy and robust construction, this therefore being advantageous for large-diameter rotary chambers. Since the outside diameter of the fins (14) may be close to the diameter of the rotary chamber (100), the diameter of the fixed circular wall (24) may also be close to the diameter of the rotary chamber (100). This makes it possible to increase the volume of the rotary chamber relative to the volume of the main chamber and therefore to improve the separation between solid particles and fluid inside the rotary chamber.

Figure 6:
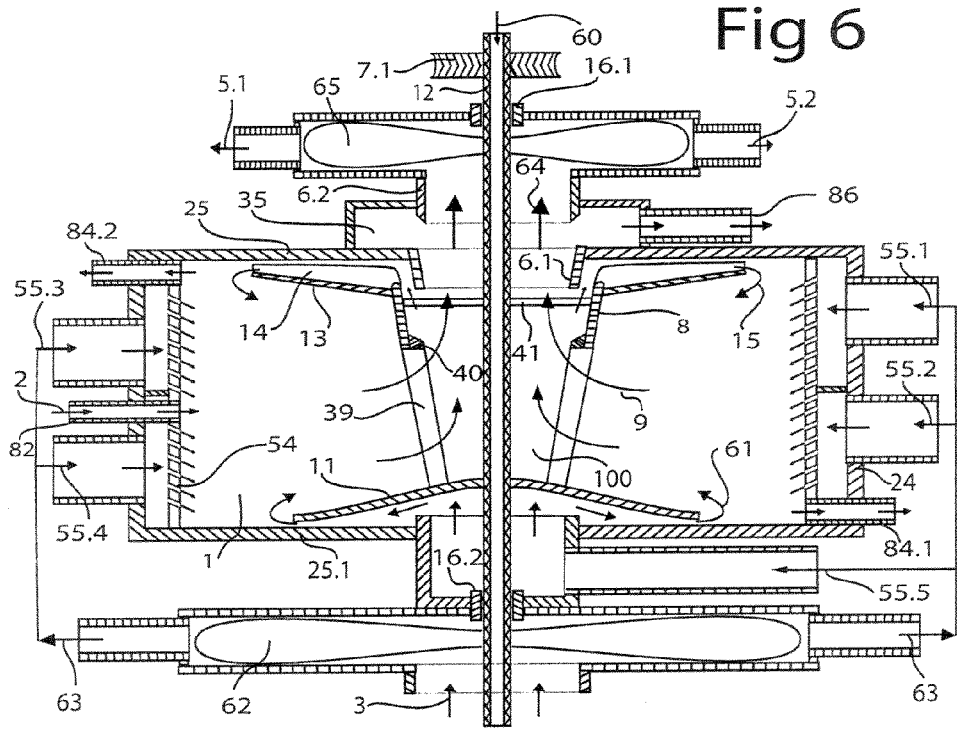
FIG. 6 is a schematic view of the longitudinal section of an example of a rotary chamber with centrifugal delivery, comprising a driveshaft connected to a compressor and to an impeller.

FIG. 6 is a schematic view of the longitudinal section of an example of a conical rotary chamber (100) in a main chamber (1), which preferably is cylindrical but may have another shape, for example polygonal and/or flared. The rotary circular wall (8) and the blades (39) form a truncated cone, the diameter of which is a maximum close to the fixed central discharge tube (6.1). The rotary lateral wall (11) is a disc, the diameter of the outer edge of which is comparable to the outside diameter of the finned wheel (13). It rotates close to the wall (25.1) of the fixed circular chamber (1) and serves to guide the fluid (55.5) which is fed into the fixed circular chamber (1) and which forms a vortex (61) repelling the solid particles towards the fixed circular wall (24) and upwards.

A fluid feed device (54), for example a porous or slotted or perforated wall, is used to feed one or more fluids (55.1) to (55.4) along the fixed circular wall (24) in a generally radial direction so as to prevent too high a concentration of solid particles along this wall, but possibly having an axial component, downwardly directed in this example, in order to force the circulation of solid particles, and/or a tangential component in order to maintain their rotation at the desired velocity.

The driveshaft (12) may be hollow so as to allow a fluid (60) to be fed which, for example, may flow inside the disc (11), the blades (39), the walls of the tube (8), the rings (13) and (40), the spokes (41) and/or the fins (14) in order to cool them, each of these elements possibly being hollow so as to allow the flow of the coolant therein. If the fluid (9) entering the rotary chamber (100) is a gas, the fluid (60) may be a liquid sprayed inside the rotary chamber (100) in order to cool the gases therein, or sprayed into the main chamber (1), in order to react with the solid particles or to impregnate them.

The driveshaft (12) is connected to a rotary pump or compressor, shown symbolically by the impeller (62), which sucks up the fluid (3) and compresses it (63) so as to feed the various fluid inlets (55.1) to (55.5). It is also connected to a turbine, shown symbolically by the impeller (65), which recovers the energy of the fluid (64) or sucks it up so as to discharge it (5.1) and (5.2), for example into suitable heat treatment or heat recovery units and possibly to be recycled. It terminates in a pulley (7.1) that may actuate an alternator or that is actuated by a motor (not shown in the figure).

The solid particles (2) may be introduced into the fixed circular chamber (1) through its circular wall (24) via the tube (82). They will accumulate between the upper vortex formed by the delivered fluid (15) and the lower vortex formed by the fluid (61) while still being repelled by the blades (39) of the rotary chamber that rotates them and by the lateral fluid feed device (54) that slows down their rotation and directs them downwards.

Under the combined action of the fluids and the blades of the rotary chamber, the finest or lightest particles accumulate along the rotary circular wall (8) and at the top of the main chamber (1), and the coarsest or heaviest particles descend along the fixed circular wall and accumulate in the bottom of the main chamber (1). They are discharged by the tubes (84.2) and (84.1) respectively, these being located on each side of the main chamber (1).

The solid particles entrained by the fluid (9) inside the fixed central discharge tube (6.1), for example because of malfunctions or because they are too fine, may be separated from the fluid by the centrifugal force in the chamber (35) serving as cyclone and may be discharged via the tube (86).

This device allows the heaviest solid particles to slide along the fixed circular wall (24) or (54) and to accumulate in the bottom of the main chamber without necessarily having to be fluidized. It is particularly suited to processes of gasification or combustion of carbonaceous particles, which decrease in size progressively during their combustion and produce scoria which may be discharged via the tube (84.1). If the device works under pressure with particles that are small enough for their combustion to be rapid, it may be used in a process for producing energy by means of a turbine actuated by the combustion of solid particles.

When the rotation axis is vertical, the feed pressure of fluid may be higher in the lower part of the main chamber so as to compensate for the hydrostatic pressure due to the gravitational force inside this chamber. If the rotation axis of the rotary chamber is horizontal, the feed pressure of the fluids at the top of the circular wall, for example (55.3) and (55.4), may be slightly below the fluid feed pressure at the bottom (55.1) and (55.2), in order to compensate for the pressure difference along the lateral wall due to the gravitational force.

Figure 7:
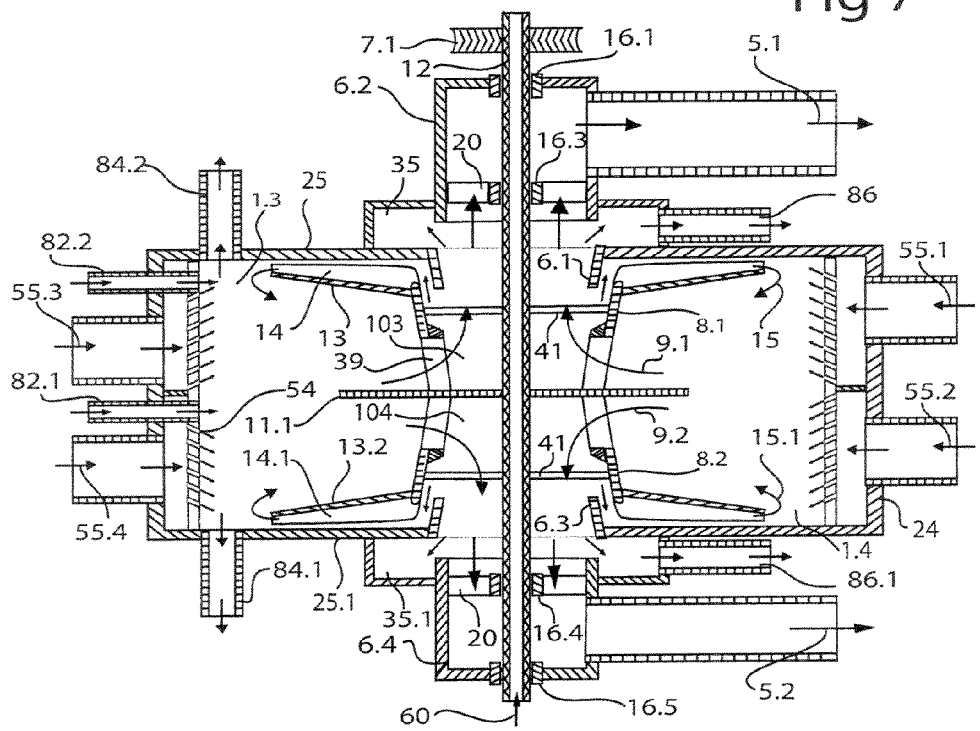
FIG. 7 is a schematic view of the longitudinal section of an example of a rotary chamber with centrifugal delivery, comprising two finned wheels.

FIG. 7 is a schematic view of the longitudinal section of an example of a rotary chamber divided into two parts, namely (103) and (104), by a disc (11.1) and comprising two wheels (13) and (13.2) having fins (14) and (14.1), close to the two opposed lateral walls (25) and (25.1) of a main chamber (1) and able to rotate about fixed central discharge tubes (6.1) and (6.3) that enter into the rotary chamber. The fluid or fluids are fed through the fixed circular wall (24) by the feed device (54), for example a porous or perforated or slotted wall, which may feed the fluid radially with, for example, an axial component oriented in the same direction, as shown in FIG. 6, so as to concentrate the coarse particles at the bottom and the fine particles at the top, or oriented in divergent directions, as shown in FIG. 7, so as to distribute the coarse particles all along the lateral circular wall (54). The finest particles may be discharged via the fixed central discharge tubes (6.1) and (6.3) and be recovered in the coaxial annular chambers (35) and (35.1) via the tubes (86) and (86.1).

One of the advantages of the rotary chamber device having two outlets is that it makes it possible to increase the ratio of the height or the length of the rotary chamber to its diameter or, for a given flowrate, to reduce the diameter of the fixed central discharge tubes and of the rotary circular wall (8) that surrounds them, and therefore to increase the difference in centrifugal force between the fins (14) and the blades (39). It also makes it possible to divide the fixed annular chamber (1) into two annular portions, through which fluids of different composition and/or at different temperatures pass, these fluids possibly being collected and recycled separately. In this case, the separation disc (11.1) may have an outside diameter close to that of the fixed circular wall (54) or (24) so as to reduce the mixing of the fluids and transfer of solid particles between the two annular portions of the main chamber (1).

For example, this device may be used in a process for polymerizing catalytic particles introduced on one side of the main chamber, via the tube (82.2), and discharged on the other side, via the tube (84.1), the passage between the disc (11.1) and the fixed circular wall (54) or (24) being reduced to the space needed to ensure suitable transfer of solid particles between the two parts separated by this disc (11.1).

If the main fluid is a gas, it is possible to spray a liquid onto the solid particles rotating in the main chamber by passing via the driveshaft and the hollow spokes (41) or via the disc (11.1). This liquid may be a comonomer or a coolant. In other applications, this liquid may serve for coating or impregnating solid particles.

This device is also suitable in processes for drying solid particles fed via the tube (82.2) and discharged via the tube (84.1). The drying gas may be fed via the feed tubes (55.2) and (55.4) and discharged via the fixed central discharge tube (6.3) so as to be recycled after suitable treatment, for example reheated and/or dried, via the feed tubes (55.1) and (55.3) and finally discharged via the fixed central discharge tube (6.1).

This device may also be used for other processes, for example for the two-step catalytic conversion of a fluid introduced via the feed tubes (55.2) and (55.4), discharged via the fixed central discharge tube (6.3), recycled via the feed tubes (55.1) and (55.3) and discharged via the fixed central discharge tube (6.1). The fresh catalyst is fed via the tube (82.2) and discharged via the tube (84.1) before being possibly regenerated or recycled.

FIG. 8 is a schematic view of the longitudinal section of another example of a rotary chamber (100) of which the central discharge opening of the rotary lateral wall (26) is surrounded by a rotary central outlet tube (90) of smaller diameter, concentric with the fixed central discharge tube (6.1) and entering the latter, the driveshaft (12) of which device is hollow and makes it possible to feed solid particles (88) or to spray a liquid (88) into the rotary chamber (100) via the tubes (87).

The driveshaft (12) is driven by a pulley (7.1) and a motor (7) that are located, in this example, on the opposite side from the outlet tube (6.1) to which it is held by the spokes or fins (20) fastened to the ball bearing (16.3). The shaft does not enter the tube (6.2) and is closed off by the deflector (70.1).

The rotary circular wall (8) of the rotary chamber (100) is in this example a rotary cylinder fastened to the driveshaft (12) by the rotary lateral wall (11) which extends inside the main chamber (1) and by the spokes (41) that are fastened to the rotary central outlet tube (90) that enters the fixed central discharge tube (6.1) and which is connected to the rotary circular wall (8) by the rotary lateral wall (26). This latter wall includes delivery openings (27) via which the fluid and the solid particles (15) are sucked up by the finned wheel (13) and delivered into the main chamber (1), along its fixed circular wall (24).

A fluid (3) containing solid particles in suspension is fed into the main chamber (1) via one or more tubes (83) preferably located on the side towards the fixed central discharge tube (6.1). The solid particles are made to undergo a rotational movement by the blades (39) on the outside of the rotary circular wall (8). The sufficiently coarse solid particles are entrained via the centrifugal force and accumulate in the circular accumulation channel (94.1) of the main chamber (1) on the side towards the inlet openings (10), and therefore on the opposite side from the feed tubes (83) and from the fixed central outlet tube (6.1). They may be discharged via the tube (84.1).

The finest solid particles are entrained by the fluid (9) in the rotary chamber (100) where they are absorbed or reacted with the solid particles (88), preferably the coarsest particles, or the droplets of a liquid, fed via the tubes (87) so as to increase their mass and therefore to be separated more easily from the fluid by the centrifugal force that entrains them towards the delivery openings (27) of the rotary lateral wall (26) via which they are delivered into the circular accumulation channel (94.2), where they concentrate and may be discharged via the tube (84.2) before entering the main chamber (1). In other words, they are entrained through the main chamber (1) and are recycled into the rotary chamber (100) or discharged via the tube (84.1) after having been able to react with the fluid and the solid particles (3) fed via the tube or tubes (83).

The fixed central discharge tube (6.1), which opens to a coaxial fixed annular chamber serving as cyclone (35), is used to separate the fluid discharged via the tube (6.2) from the solid particles (36) entrained in the fixed central discharge tube (6.1), for example because of malfunctions, and to discharge them via the tube (86).

A tube (89) is used to feed a fluid into the space between the rotary lateral wall (11) and the fixed wall of the main chamber (1) and deflectors (70) may guide the discharged fluid and protect the ball bearing (16.3), possibly also protected by packings, against the fine solid particles entrained by this fluid.

This device therefore makes it possible to remove the fine and coarse particles in suspension in a gaseous or liquid fluid (3), while separating them. The entrainment of the finest particles by the centrifugal force combined with the action of the active solid particles (88) or of the drops of an active fluid that are fed into the rotary chamber (100) makes it easier to remove the finest solid particles in suspension in this fluid (3).

This device also enables the solid particles fed into the main chamber (1) to react with solid particles or droplets (88) fed into the rotary chamber (100), for example in order to coat or impregnate them.

FIG. 9 shows a schematic view of the longitudinal section of an example of the double-walled rotary chamber, the rotary separating wall (130) of which divides the rotary chamber into two parts, namely a rotary reaction chamber (102) and a rotary separating chamber (101).

Figure 11:
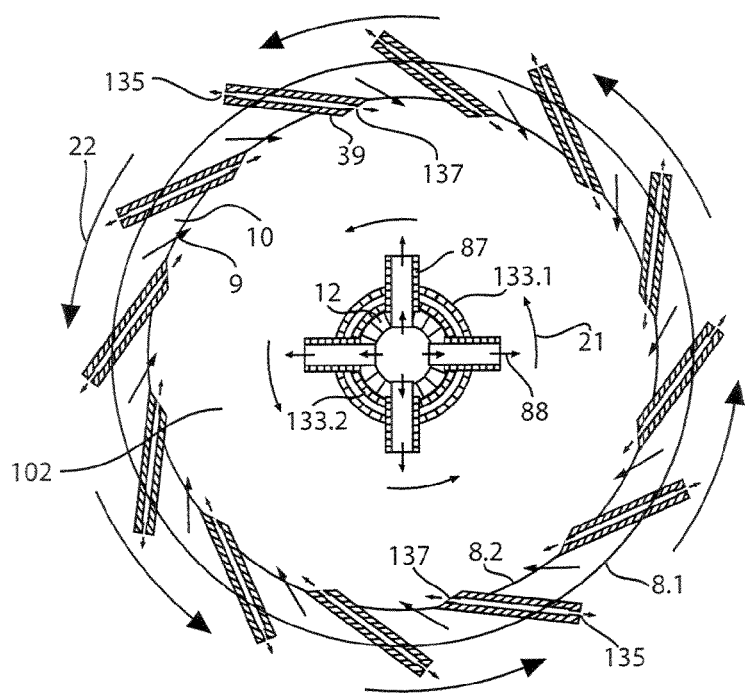
FIG. 11 is a schematic view of a cross section of an example of the hollow blades surrounding the inlet openings of the rotary chamber with centrifugal delivery of FIG. 9.

The hollow driveshaft (12) and (12.1) is divided by a plug (75) into two parts that are fed separately, so as to be able to feed solid particles (88) or to spray droplets of a liquid into the rotary reaction chamber via a device (59) through the tubes (87) and to make another fluid (58), for example a coolant, flow between the two walls of the rotary chamber and to inject it into the central discharge tube (6.1) and/or (6.2) via the openings (136) and/or into the main chamber (1) or (101) via the openings (135) or (137) shown in FIG. 11.

A fluid (3) is fed into the main chamber (1) via the tubes (83) through a feed device (54), for example a porous or perforated or slotted wall. It is mixed and can react with the rapidly rotating delivered solid particles (15). The solid particles that have reacted with the fluid (3) may accumulate in the circular accumulation channel (94) under the effect of the centrifugal force and they may be discharged (4.1) via the tube (84.1).

The fluid (9), which may entrain solid particles, enters the rotary reaction chamber (102) through, blades (39) that increase or slow down the rotational movement, depending on their orientation, and which can repel some of the solid particles entrained by the fluid.

According to one particular embodiment, the blades (39) are oriented in the direction that repels the solid particles, so that they accumulate in the circular accumulation channel (94) from which they are discharged via the tube (84.1) and therefore to separate them from the fluid (9) that enters the rotary reaction chamber (102), where it can react with the solid particles or droplets of a liquid fed via the tube (87).

According to another particular embodiment, the blades (39) are oriented in the direction that favours entry of the fluid (9), accompanied by solid particles, generally the lightest ones, into the rotary reaction chamber (101) where they can react with the solid particles (88) or the droplets of a liquid fed via the tube (87), while preventing the solid particles from leaving via the inlet openings (10).

A deflector, for example a ring (134), may keep the solid particles inside the rotary reaction chamber (102), so as to increase the duration of their residence time inside this chamber and therefore their time during which they are in contact with the flow of fluid (9), accompanied by solid particles.

The combination is sucked up into the rotary separating chamber (101) through the passage or passages between the rotary separating wall (130) and the inner rotary circular wall (8.2) of the rotary chamber, between the guides (131), which may be blades or fins and the shape and orientation of which make it possible to increase the rotational velocity of the fluid and of the solid particles that have been slowed down by the fluid (9) because of the orientation and the inclination of the blades (39) and/or by the Coriolis acceleration on the solid particles or liquids fed via the tubes (88), so as to better separate the fluid from the solid particles, which slide along the circular wall (8.2) of the chamber (102) towards the delivery openings (27) made through the rotary lateral wall (26) before being delivered (15) by the finned wheel (13) into the main chamber (1), entraining some of the fluid.

The rest of the fluid (29) is sucked up by the fluid discharge device (5) into the fixed central discharge tube (6.1) through the rotary central outlet tube (90) and the spokes (41). It passes through the spokes or fins (20) which hold the driveshaft (12.2) in place and through the cyclone (35) where the finest particles (36) are recovered via the tube (86).

The rotary separating wall (130) may have a flared shape and, together with a deflector (139), may form a baffle so as to promote separation between the discharged fluid (29) and the delivered fluid and solid particles (15).

A secondary fluid may be fed via a tube (89) into the space between the rotary lateral wall (11) and the fixed wall of the main chamber (1). This may react with the solid particles (4.1) before their discharge and, depending on its flowrate, it may deliver the finest particles into the main chamber (1).

The hollow driveshaft (12) and (12.1) is divided by a plug (75) into two parts fed separately, so as to be able to feed a fluid (58), for example a coolant, via the driveshaft (12) into the hollow rotary lateral wall (26) through the sleeve (132) and the hollow spokes (41). This fluid can then pass into the hollow fins (14) and then into the space (8.3) between the rotary circular walls (8.1) and (8.2) and finally into the hollow blades (39), from which it is injected into the main chamber (1) and/or the rotary chamber (102) via openings (135) and/or (137) shown in FIG. 11.

Another part of the fluid (58) may be fed through the sleeve (133) into the hollow rotary lateral wall (11) and the rotary separating wall (130). The latter may be connected to the rotary circular wall (8) by the hollow guides (131). This fluid is then injected into the main chamber (1) and/or the rotary chamber (102), possibly passing via the hollow blades (39).

Another part of the fluid (58) may be injected into the fixed central discharge tubes (6.1) and (6.2), via the openings (136), for example to cool the discharged fluid.

This device of FIG. 9 may be used in a process for the gasification of solid carbonaceous particles, for example from the grinding of a biomass.

It allows these solid carbonaceous particles, fed via the tubes (88), to be brought into contact with a gas (9) coming from the main chamber (1), said gas being very hot and partially oxidizing, but the oxidation capacity of which is of an order of magnitude lower then the amount of biomass to be gasified, so as to gasify all that can be gasified, in a relatively short time in the rotary reaction chamber (102).

The gas mixture containing cokified residual solid particles is transferred into the rotary separating chamber (101) between the guides (131) which increase its rotational velocity so as to better separate the solid particles from the gas mixture by the centrifugal force.

The cokified residual solid particles are delivered by the finned wheel (13) into the fixed annular chamber (1) where they react with the oxidizing gas (3), for example a mixture of steam and pure oxygen, the oxidation capacity of which is significantly greater than the amount of residual carbon to be oxidized. This reaction allows the residual carbon to be completely burned off and the gas (3) to be heated to the desired temperature before entering the rotary chamber (102).

The finest ash particles may be entrained by the fluid (9) in the rotary chambers and then by the discharged fluid (29). They may be recovered in the coaxial chamber (35) acting as a cyclone. The fixed spokes or fins (20) may be profiled and oriented so as to increase the rotational velocity of the discharged fluid (29), so as to improve the separation of these fine ash particles from the discharged fluid (29).

The coarsest ash particles (4.1) may be accumulated by the centrifugal force in the circular accumulation channel (94) and are discharged via the tube (84). The fluid mixture (29) coming from the gasification is discharged via the fixed central discharge tube (6.1) inside which it may be cooled by a fluid (58), for example water or steam, injected through the openings (136).

A complementary amount of this same fluid may flow between the two walls of the rotary chamber so as to cool them and, for example, after evaporation, may be injected into the main chamber (1).

This device may also be used for other processes, for example two-step processes for the catalytic conversion of fluids. The fluid is fed via the tubes (3) through the device (54) into the main chamber where it undergoes a first conversion upon contact with the catalyst (15) delivered by the finned wheel (13). The spent catalyst is then discharged via the tube (84) and the converted fluid (9) enters the rotary reaction chamber (102) where it is brought into contact with fresh or regenerated catalyst, supplied by the tubes (87). The fluid undergoes a second conversion upon contact with the fresh catalyst, which may for example have been heated or cooled so as to provide the heat or refrigeration necessary for endothermic or exothermic reactions, respectively. It is then separated in the rotary separating chamber from the delivered catalyst (15) in order to be discharged (29).

Figure 10:
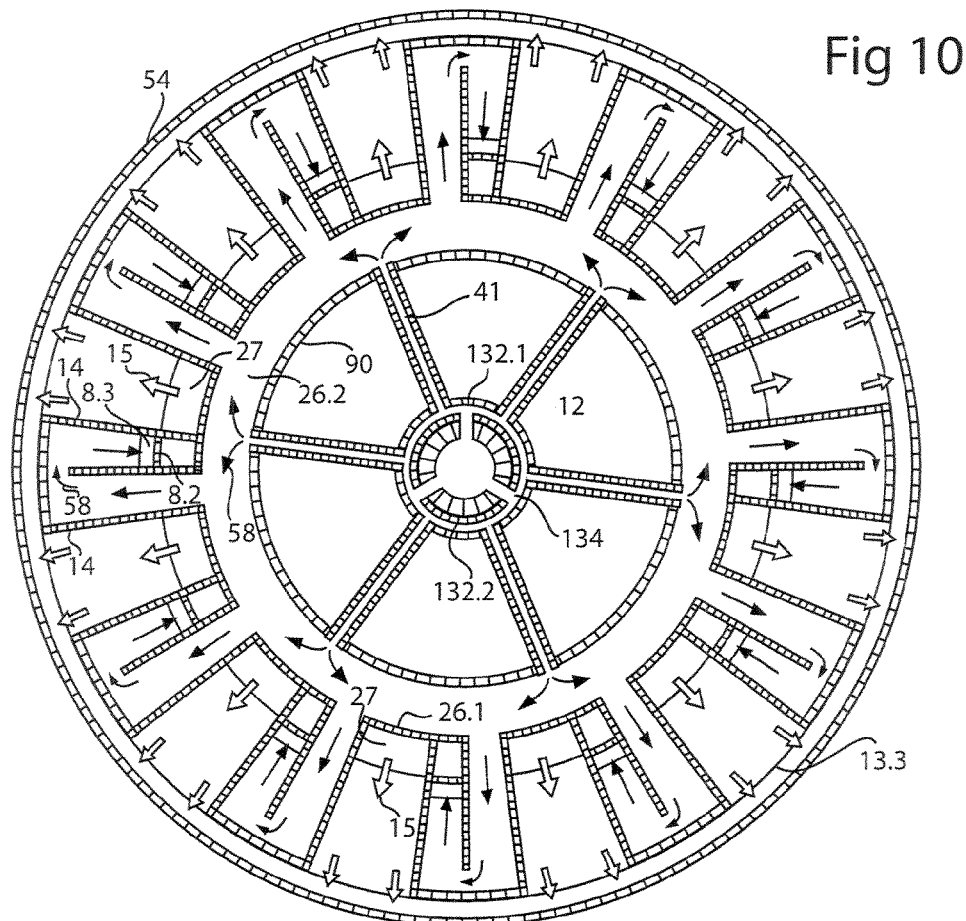
FIG. 10 is a schematic view of a cross section of an example of the finned wheel of FIG. 9 having hollow fins.

FIG. 10 is an example of a cross section of an example of the hollow-finned wheel of FIG. 9, in the plane AA', passing through the empty space (26.2) of the rotary lateral wall (26) of the rotary chamber. The centre of the figure shows the cross section of the driveshaft (12) via which the fluid (58) is fed into the double-walled sleeve having walls (132.1) and (132.2) via the openings (134). The fluid passes into the hollow spokes (41) and enters the hollow part (26.2) of the hollow lateral wall (26) through the rotary central outlet tube (90). It then flows inside the hollow fins (14) and enters between the inner wall (8.2) and the outer wall of the rotary circular wall (8) via the openings shown schematically via the rectangles (8.3).

The discharged fluid and solid particles (15) enter the passages or the space located between the hollow fins (14) through the rotary lateral wall (26) along its wall (26.1) via the delivery openings, shown schematically by the rectangles (27). The solid particles and the fluid are delivered by the centrifugal force and enter the main chamber (1) passing via the space located between the fixed circular wall (54) and the outer edge (13.3) of the wheel (13).

This figure illustrates an example in which the thickness of the hollow fins is equal to the thickness of the passages or of the free space between the fins, and progressively increases from the centre towards the outside. The passages between said hollow fins could for example be narrower and of constant cross section so as to reduce the flowrate and therefore increase the concentration of solid particles therein.

FIG. 11 is a cross section of an example of the hollow blades (39) along the inlet openings (10) of the rotary chamber of FIG. 9, in the plane BB'. This shows at the centre the cross section of the driveshaft (12) via which the solid particles (88) are fed into the tubes (87) through the walls (133.1) and (133.2) of the sleeve (133). The hollow blades, rectangular sections (39) of which may be seen, are provided with openings (135) and/or (137) via which the fluid (58), which flows inside the two walls of these blades, may be injected into the main chamber (1) and/or into the rotary reaction chamber (102).

The arrows (21) and (22) indicate the direction of rotation of the rotary chamber. In this example, the fluid (9) coming from the main chamber (1) enters the rotary chamber (102), passing between the blades (39) in the opposite direction to the direction of rotation, thereby reducing the centrifugal force and therefore making it easier for the fluid to pass, by reducing the pressure drop through the inlets (10). This also reduces the rotational velocity of the fluid and of the solid particles inside the rotary chamber (102) and therefore the centrifugal force. This makes it easier to fluidize the solid particles (88) fed into this chamber (102).

Figure 12:
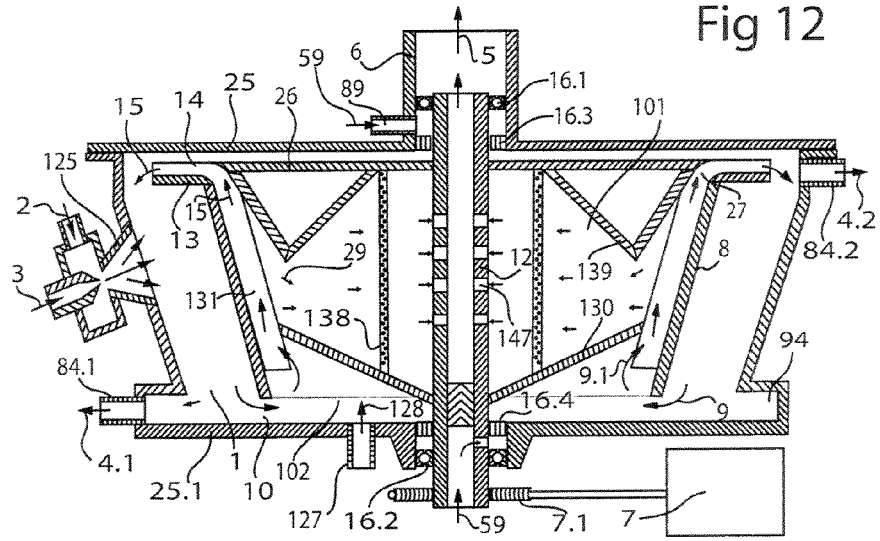
FIG. 12 is a schematic view of the longitudinal section of another example of a rotary chamber with centrifugal delivery, inside a main circular chamber, for circulating the microparticles between the main chamber and the rotary chamber, even with a low fluid flowrate.

FIG. 12 is a cross section of another example of a rotary chamber with centrifugal delivery, which is divided into two parts (101) and (102) by a rotary separating wall (130) and in which the amount of fluid to be discharged is relatively small and may take place via the driveshaft (12), which is hollow and provided with openings (147) via which the fluid can pass so as to be discharged by the fluid discharge device (5) through the fixed central discharge tube (6).

Solid particles (2) mixed with a fluid are dispersed by a fluid jet (3) and introduced into the main circular chamber (1) via the flared tube (125) and other solid particles (128) are fed via one or more tubes (127) through the fixed lateral wall (25.1) directly into the open rotary chamber (102). The tube or tubes (127) may also spray fine droplets of a liquid if the fluid supplied by the tube (3) is a gas.

The fluid (9) containing solid particles travels from the main circular chamber (1) to the rotary chamber (102) via the inlet opening (10), which is the space between the end of the rotary circular wall (8) and the fixed lateral wall (25.1).

According to one particular embodiment, blades with an orientation similar to that in FIG. 11, may be fastened along the end of the rotary circular wall (8) and pass through part of the space (10) so as to promote passage of the fluid (9) containing solid particles and prevent the solid particles (128) from leaving via the inlet opening (10). According to another particular embodiment, blades may be fastened along and to the outside of the rotary circular wall (8) and close to the inlet opening (10), so as to increase the rotational velocity of the fluid in the fixed circular chamber (1) and therefore repel the solid particles entrained by the fluid (9) into the circular accumulation channel (94).

The mixture of fluid and solid particles entrained by the fluid (9.1) passes into the rotary separating chamber (101) between the guides (131) that guide the fluid so as to increase its rotational velocity. Deflectors (139) promote separation of the discharged fluid (29) from the solid particles accompanied by the delivered fluid (15) which are entrained by the finned wheel (13) through the delivery openings (27) into the main chamber (1). The fluid (29) is sucked up through a filter (138) and through the openings (147) in the hollow driveshaft (12) into the fixed central discharge tube (6) via the fluid discharge device (5).

A tube (84.1) is used to discharge the solid particles (4.1) that accumulate in the circular accumulation channel (94) under the effect of the centrifugal force generated by the rotary circular wall (8), which wall is provided, if necessary, with external blades. They may also be discharged via the tube (84.2), for example for purging or draining the reactor.

Ball bearings (16.1) and (16.2), protected by packings (16.3) and (16.4) between which a separating fluid (59) may be fed via the tube (89) and via the other end of the hollow driveshaft (12), symbolize the device for sealing between the rotary device and the main chamber (1).

This device makes it possible, for example, for the solid particles (2), for example nanoparticles, fed via the flared tube (125) to react with the solid particles (128), for example microparticles or droplets of a liquid fed via the tube or tubes (127). For example, nanoparticles (2) may be attached to microparticles (128), or fine droplets of a liquid (128) may impregnate microparticles (2) flowing between the chamber (101) and the main chamber (1).

Figure 13:
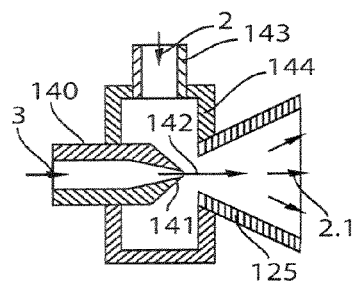
FIG. 13 is a schematic view of the cross section of an injector for breaking up the agglomerates of nano-particles or microparticles before they are fed into a main chamber.

FIG. 13 shows the cross section of an example of a device that can be used for feeding nanoparticles (2) into the main chamber (1) via the flared tube (125), enabling the agglomerates of nanoparticles to be separated and dispersed.

A liquid or a compressed gas (3) fed via a tube (140) through a very small opening (141) may form a powerful jet (142) passing through a chamber (144) where the agglomerates of nanoparticles (2) are fed. The injection velocity of the fluid (3) must be high enough to be able to break up the agglomerates of nanoparticles that are dispersed and slowed down in the flared tube (125) before entering the main circular chamber (1), and where they become attached to the rotating microparticles inside said main circular chamber (1).

The nanoparticles may be replaced with or contained in a liquid which is sprayed very finely onto the solid particles, for example microparticles, circulating in the main chamber (1) and along the rotary circular wall (8) so as to coat or impregnate them.

The device of FIG. 12 and FIG. 13 may therefore be used in a process for impregnating or coating micro-particles with a liquid and/or nanoparticles. The finned wheel (13), the guides (131) and the optional blades along the inlet opening of the rotary chamber make the solid microparticles, fed into said rotary chamber, flow along the rotary circular wall (8) of said rotary chamber and in the main chamber that surrounds said rotary chamber within which they may react with the nanoparticles and/or the fine droplets of a liquid.

The agitation of the microparticles may prevent them from agglomerating, and a drying gas or a fixing fluid may be fed into the main chamber (1) between the inlet opening (10) and the flared tube (125). The size and shape of the main chamber (1) and of the rotary chamber (102), and the size of the central outlet opening, shown in this example by the outlet of the hollow driveshaft (12), may be adapted to the drying or fixing requirement.

FIG. 14 shows the longitudinal cross section of a rotary chamber with centrifugal delivery similar to that of FIG. 9, in which the double rotary circular wall (8.1) to (8.3) is doubly and highly flared. The rotary lateral wall (11) and the blades (39) have been replaced by hollow rotary spokes (42), which connect the sleeve (133) to the double rotary circular wall, which feed its hollow part (8.3) with fluid, for example a coolant, and which may take the form of blades (39) positioned transversely. The inlet opening (10) via which the fluid (9) can enter the rotary reaction chamber (102) is the space between the spokes or blades (42) and the fixed lateral wall (25.1).

Solid particles (128) may be fed via one or more tubes (127) into the rotary reaction chamber (102) through the fixed lateral wall (25.1) of the main chamber (1) and the rotary blades or spokes (42). This makes it possible to use the hollow driveshaft (12) only for feeding a fluid serving for example to cool the two walls of the rotary chamber through the sleeves (132) and (133) and a fluid discharged via the fluid discharge device (5) through the openings (136).

Since the rotary circular wall is highly flared, the wheel (13) is reduced, in this example, at the end of the double rotary circular wall and the fins (14) are extended to the outside of the rotary circular wall (8) and may be curved so that the solid particles are pushed longitudinally into the main chamber (1).

To form a smooth continuous surface along which the solid particles can slide, the fins (14) are also connected to the guides (131) that guide the fluid coming from the rotary chamber (102) between the deflector (134) and the rotary separating wall (130) along the rotary circular wall (8.2).

A series of tubes (83.2) also make it possible for a fluid (3.2) to be fed longitudinally through the fixed lateral wall (25) at the ends of the fins (14). Tubes (89.1) and (89) feed a fluid into the space between the fixed central discharge tube (6.1) and the rotary central outlet tube (90) or the rotary wall (26), and also into the space between the bearing bush (16.4) and the ball bearing (16.2) in order to prevent the solid particles from passing through these spaces.

The operation of this device is similar to that of FIG. 9. The solid particles (128) fed via the tube or tubes (127) encounter the fluid (9) inside the rotary reaction chamber (102) where their rotational velocity may be substantially lower than the rotation speed of the rotary chamber, depending on the orientation of the blades or spokes (42). The mixture of fluids and solid particles (9.1) is then transferred into the rotary separating chamber (101) via the passages provided between the rotary separating wall (130) and the rotary circular wall (8.1) between guides (131) that are oriented so as to increase its rotational velocity so as to better separate the fluid (29) which is discharged via the fluid discharge device (5) through the rotary spokes or fins (41) and the fixed spokes or fins (20), from the fluid and the solid particles (15) that are entrained by the finned wheel (13) through the delivery openings (27) into the main chamber (1) where they can react with the fluid or fluids (3), (3.1) and (3.2) fed via the tubes (83), (83.1) and (83.2) through the perforated wall (54) or the fixed lateral wall (25).

After this second reaction, the solid particles may be discharged via the tube (84) and the fluid (9) is discharged through the rotary reaction chamber (102). The finest solid particles (36) which are entrained by the fluid (9) and the fluid (29) may be recovered in the chamber (35) serving as a cyclone via the tube (86).

In this example, only the rotary circular wall (8.1) to (8.3) is a double wall, assuming only this rotary wall is exposed to a very high temperature of the main chamber (1), in so far as the temperatures of the rotary circular chambers (102) and (101) may be cooled by introducing solid particles (127) generating an endothermic reaction, for example a gasification reaction, and/or by a coolant injected via the openings (136). For example, when this device is used in a two-step process for the gasification of carbonaceous particles, the solid particles (128) cool the gas (9) and are only partially oxidized in the rotary chamber (102). This makes it possible to maintain therein not too high a temperature, whereas the complete combustion of the cokified residual solid particles (15) delivered into the main chamber (1) enable a very high temperature to be obtained in the main chamber (1).

Figure 15:
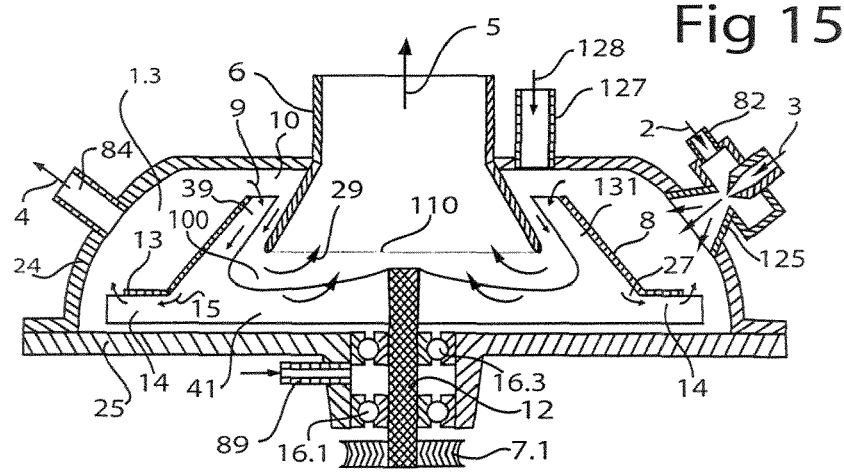
FIG. 15 is a schematic view of the longitudinal section of an example in which the fixed central discharge tube (6) is flared, enters the rotary chamber and separates the inlet opening from the central outlet opening.

FIG. 15 shows the longitudinal section of another example of a rotary chamber with centrifugal delivery, in which the fixed central discharge tube (6) enters the rotary chamber (100) and separates the discharge opening (110) from the inlet opening (10) which is the open space between the rotary circular wall (8) and the wall, flared in this example, of the fixed central discharge tube (6). The finned wheel (13) and the delivery openings (27) are located on the opposite side from the rotary circular wall (8) of the rotary chamber (100) and therefore beyond the fixed central discharge tube (6).

In this example, the rotary circular wall (26) is replaced by blades or spokes (41) that are connected to the fins (14) and to the blades (39) by the guides (131), the combination forming continuous surfaces fastened along the rotary circular wall (8) and along the wheel (13) and are connected to the driveshaft (12) so as to form a rigid assembly that can rotate rapidly close to the fixed lateral wall (25) of the main chamber (1.3) and along which the solid particles can slide and be delivered into the main chamber (1.3). The driveshaft (12) is held in place by the bearing bushes (16.1) and (16.3), which may include ball bearings or drillings and between which a fluid can be fed via a tube (89) so as to maintain a pressure above the pressure in the main chamber (1.3) in order to prevent fluid or solid particles from leaving via the space between the driveshaft (12) and the bearing bush (16.3).

Solid particles (128) may be introduced via a tube (127) located facing the opening (10), thereby enabling these solid particles, for example microparticles, to be introduced directly into the rotary chamber (100) without having to pass, for example, through the driveshaft. These solid particles run along the rotary circular wall (8) between the guides (131). One portion (29) of the fluid that accompanies them is separated under the effect of the centrifugal force and is discharged by the device (5) through the discharge opening (110) of the fixed tube. The other portion of the fluid and the solid particles (15) are sucked up through the delivery openings (27) and are delivered by the finned wheel (13) having fins (14) into the main chamber (1.3).

The fluid forms a vortex that supports the solid particles which may form a stirred, dense, annular fluidized bed, rotating rapidly along the fixed circular wall (24) of the main chamber (1.3) before again being entrained by the swirling fluid (9) into the rotary chamber (100) through the opening or space (10) between the blades (39).

Other solid particles (2), such as for example nanoparticles, or fine droplets of a liquid possibly containing nanoparticles, may be sprayed by a gas jet (3) into the chamber (1.3) onto the fluidized bed, through the flared tube (125), and can react with the microparticles that may be stirred sufficiently to prevent them from agglomerating.

If the process using this device, for example a microparticle coating or impregnation process, is a batch process, the solid particles (128) may firstly be introduced into the chamber (1.3) and then react with the fluid or the particles (2) for the time needed to achieve a suitable uniform coating or impregnation, and may finally be discharged via the tube (84) which may be located close to the finned wheel, at the point where the concentration of solid particles may be the highest.

This sequential approach makes it possible to minimize the amount of fluid (29) that has to be discharged in order to maintain the pressure in the chamber (1.3) at the desired level, thereby reducing the risk of microparticle entrainment through the fixed central discharge tube (6), and therefore reducing the size of the particulate filters that have to be used, these possibly being purged during the solid-particle discharge phase.

When the process using this device is continuous, the tube (84) for discharging the solid particles is preferably located in the upper part of the chamber (1.3), at the point where the solid particles are passed at least once through the fluidized bed and therefore are able to react before being discharged.

This device therefore makes it possible to achieve a continuous flow of a dense rotary fluidized bed of solid microparticles and to coat them, impregnate them or make them react with nanoparticles or very fine droplets of an active liquid, in a virtually sealed chamber.

FIG. 16 shows a longitudinal section of another example of a rotary chamber with centrifugal delivery, in which the amount of fluid to be discharged is low enough to be discharged through the openings (147), via the hollow driveshaft (12) that passes through the rotary chamber. It is held in place inside the fixed central discharge tube (6) by bearing bushes (16.2) and (16.4) and the fixed lateral wall (25) by bearing bushes (16.1) and (16.3), between which a fluid may be fed in order to maintain therein a pressure above the pressure of the main chamber (1.3). It is connected to a motor (not shown) via a pulley (7.1).

A rotary separating wall (130) separates the rotary chamber into two parts, namely the rotary separating chamber (101) and the rotary reaction chamber (102), the latter being bounded by the rotary circular wall (8), extended by the blades (39), the rotary separating wall (130) and the fixed lateral wall (25.1) of the main chamber (1.3). The blades (39) bear against an annular deflector (134) that allows the solid particles to accumulate in the rotary reaction chamber (102) and therefore to increase their residence time.

The passage or passages from the rotary reaction chamber (102) to the rotary separating chamber (101) between the rotary separating wall (130) and the rotary circular wall (8) have guides (131) which may be simple lengthwise members and may be able to join the fins (14) so as to form a continuous surface.

In the diagrams of FIGS. 15 and 16, the device (125) for spraying the fluid or for feeding solid nanoparticles may be replaced by other solid-particle or fluid feed devices, for example a fluid feed device similar to the device (54) of FIGS. 6 and 9.

In the diagram shown in FIG. 15, the shapes of the conical or flared walls of the rotary circular wall (8) and of that part of the fixed central discharge tube (6) which is located inside the rotary chamber may be modified so as to divide the rotary chamber into two parts, in order to obtain a rotary reaction chamber (102) that may contain an accumulation of solid particles, as in the diagram shown in FIG. 16. This makes it possible, for example, to use this modified diagram for solid-particle gasification processes, as in the diagrams of FIGS. 9 and 14.

Figure 17:
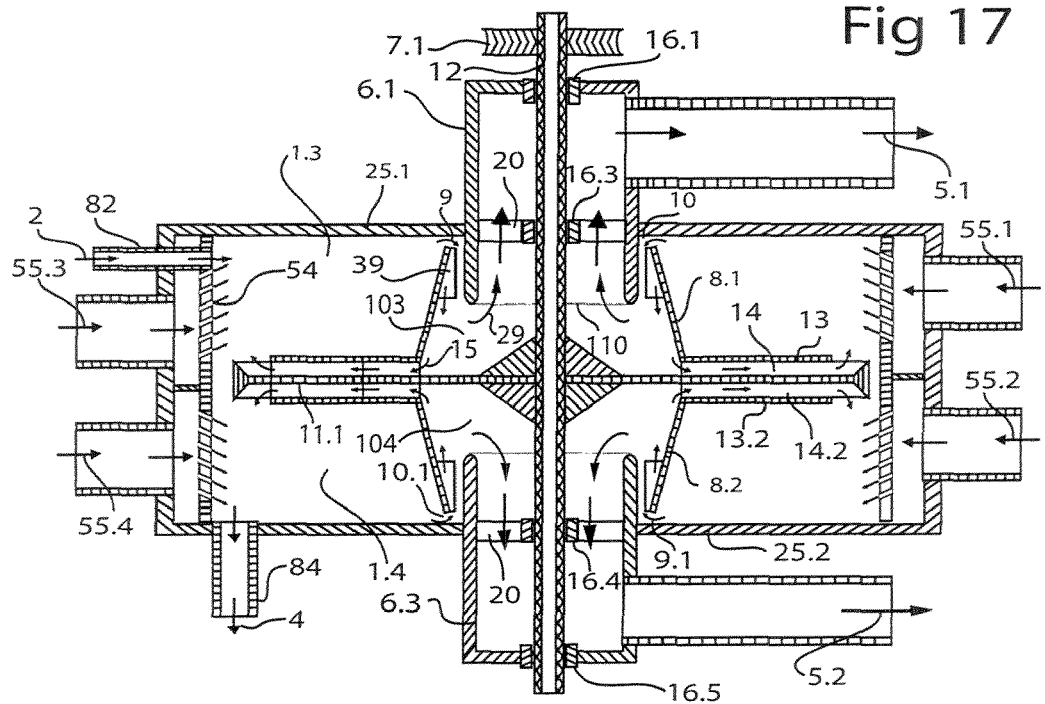
FIG. 17 is a schematic view of the longitudinal section of an example of a rotary chamber with centrifugal delivery, with a finned wheel placed in the middle part and two fixed central discharge tubes separating the inlet openings from the outlet openings.

FIG. 17 shows an example of a longitudinal section of a rotary chamber with centrifugal delivery that is open, that is to say without rotary lateral walls, into which two fixed central discharge tubes (6.1) and (6.3) enter, these tubes separating the inlet openings (10) from the two central discharge openings (110) located on each side of said rotary chamber, and in which the finned wheel (13) having fins (14) surrounds the middle of the rotary circular wall (8) of said rotary chamber.

A disc (11.1) separates the rotary chamber into two parts (103) and (104) and the finned wheel into two parts, namely the wheels (13) and (13.2) having fins (14) and (14.2). The outer edge of the disc (11.1) is close to the fixed circular wall (54) of the main chamber that it separates into two parts (1.3) and (1.4).

The feed device (54) and discharge device of the main chamber are similar to those of FIG. 7 and the rotary chamber is similar to the rotary chamber of FIG. 15 joined at its reflection to a separating disc (11.1) and with a driveshaft (12) passing through the double rotary chamber and passing through the two fixed central discharge tubes (6.1) and (6.3).

The main difference of this device from that of FIG. 7 is that the absence of a finned wheel along the fixed walls (25.1) and (25.2) promotes the entry of the solid particles into the rotary chambers (103) and (104) and therefore a large flow of solid particles along the rotary circular walls (8.1) and (8.2) and inside the main chambers (1.3) and (1.4), as in the diagrams of FIGS. 15 and 16. This continuous flow of solid particles enables the contents of the main chambers (1.3) and (1.4) to be homogenized.

This device having two chambers and two opposed discharge outlets enables fluids of different composition and/or at different temperatures to pass through each main chamber. It therefore allows continuous operation for processes requiring two different reactions, for example the coating of solid particles followed by the drying or catalytic polymerization of copolymers. It also makes it possible to ensure better homogeneity. The dimensions of each of the main chambers may be adapted to different reaction rates and therefore to different residence times of the solid particles necessary for the various reactions.

This device also makes it possible to introduce other solid particles or to spray a liquid into one or both of the rotary chambers through the hollow driveshaft (12) as in the device of FIG. 8 and/or to feed solid or liquid particles facing the blades (39), as in the device of FIG. 15, in order to make them enter the rotary chamber directly.

The device (125) for spraying nanoparticles or fine droplets of a liquid of FIGS. 14 and 15 may replace the device (54) for feeding a fluid into one or both main chambers (1.3) and (1.4) so as to continuously improve the homogeneity of the impregnation, for example of microparticles with nanoparticles. The microparticles are fed from one side, for example into the main chamber (1.3) via a tube (82) or into the rotary chamber (103) via a tube passing through the fixed lateral wall (25.1)

facing the inlet openings (10). They pass from the rotary chamber to the main chamber via the finned wheel (13) and return to the rotary chamber via the inlet opening (10), by rotating around the rotary wall (8.1) for a certain time, until they enter the main chamber (1.4) via the narrow passage between the fixed circular wall (54) and the rotary lateral separating wall (11.1) and rotate in succession inside the main chamber (1.4) and the rotary chamber (104) pushed by the wheel (13.2) having fins (14.2). This enables them to be impregnated in succession with the nanoparticles or the micro droplets injected into the main chamber (1.3) and then into the main chamber (1.4), or else to impregnate them in the main chamber (1.3) and to dry them in the main chamber (1.4).

It is also possible to divide the rotary chamber (103) and/or (104) by rotary separating walls (130) according to the diagrams similar to that of FIG. 16, thereby making it possible, for example, to dry or fix the solid particles in the rotary chambers (103.1) and (104.1) progressively as they are impregnated in the main chambers (1.3) and (1.4) by injecting the drying or fixing fluid facing the inlet openings (10) and (10.1).

The diagrams similar to those of FIGS. 14, 15, 16 and 17, in which the inlet openings of the rotary chamber (100) are located facing one or both of the fixed lateral walls of the main chamber, are advantageous when it is desirable to have a large flow of solid particles going from the main chamber into the rotary chamber and/or when the amount of fluid to be discharged by the fixed central discharge tube (6) is relatively small.

These diagrams also make it possible to feed solid particles directly into the rotary chamber without passing via the driveshaft (12). However, it is also possible to feed solid particles into the rotary chamber through inlet openings away from the walls of the main chamber (1) by making a fixed feed tube pass through this chamber, the end of which tube is close to said remote inlet openings.

According to particular embodiment of the invention, the rotary chamber comprises:
- a disc or rotary separating wall (130) that divides it into two parts connected by one or more passages between said rotary separating wall (130) and the rotary circular wall, one part being called the rotary separating chamber (101), which is located on the side towards the central outlet opening, and the other part being called the rotary reaction chamber (102) where said inlet opening or openings (10) are located;
- a wheel (13) having fins (14), which is fastened around the end of the rotary circular wall (8) on the side toward the central outlet opening;
- a second, inner wheel (113) having blades (114) which is fastened to the inside of the rotary chamber against said rotary separating wall (130) on the side towards the reaction chamber, the inner wheel or annular disc (113) being fastened against and along the internal surface of the rotary circular wall and its inside diameter leaving a passage for the fluid and the solid particles that have entered the rotary reaction chamber (102) via the inlet openings (10) to be sucked up by said inner wheel (113) having blades (114) and delivered into the rotary separating chamber (101).

According to one particular embodiment, said inlet openings (10) may be located along the rotary lateral wall (11) closing off said rotary reaction chamber (102). One or more tubes (127) for feeding fluid and/or solid particles may be fastened along the fixed lateral wall (25.1) of said main chamber (1) and located facing said rotary wall (11), enabling said fluid and/or said solid particles to be introduced into said rotary reaction chamber (102) through said inlet openings (10).

According to another particular embodiment, the lateral side of said rotary reaction chamber (102) may be open, without a rotary lateral wall (11) closing it off, said inlet opening (10) consequently being the free space between the end of said rotary circular wall (8) and the fixed lateral wall (25.1) closing off said main chamber (1). One or more tubes (127) may be fastened along said fixed lateral wall (25.1) facing said open lateral side, enabling said fluid and/or said solid particles to be introduced into the open rotary reaction chamber (102).

FIG. 18 is a schematic view of the longitudinal section of an example of a rotary chamber with centrifugal delivery which is open, that is to say without a rotary lateral wall, and which is divided into two separate parts by a rotary separating wall comprising an inner wheel (113) with blades (114).

Since this device may advantageously be used in various processes requiring two reactions and/or substantial flow of solid particles to be converted or of catalytic particles to be regenerated, the description below describes, by way of illustration but not limitingly, its use in a process for the gasification of carbonaceous solid particles, such as biomass.

The rotary chamber is divided into a rotary separating chamber (101) and a rotary reaction chamber (102) that are separated by a rotary separating wall (130), the diameter of which is smaller than the diameter of the rotary circular wall (8), and against which is fastened an inner wheel (113) having blades (114) comprising an annular disc (113) that is fastened against and along the inner surface of the rotary circular wall (8).

The blades (114) connect the annular disc (113) and the rotary circular wall (8) to the rotary separating wall (130) which is fastened to a sleeve (133) that protects and surrounds the driveshaft (12). In this example, the fins (14) of the finned wheel (13) are connected to the blades (114) via guides (131) so as to form continuous smooth surfaces and to increase the rigidity of the rotary chambers (101) and (102) rotating about the driveshaft (12).

In this example the rotary circular wall (8) is cylindrical. As in all the other figures, this is not limiting. It may for example be flared, domed or doubly flared, as illustrated by FIG. 9, 14 or 17, and its surface may for example have the form of a corrugated sheet forming a succession of longitudinal channels. The latter shape may be advantageous, for example for processes involving heat exchange between the main chamber and the rotary chambers, as it enables the area for heat exchange to be increased, while increasing the longitudinal rigidity of the rotary circular wall and its suitability for non-uniform thermal expansion.

Solid particles (128), for example ground biomass particles, are fed into the rotary reaction chamber (102) via the tube (127). They are repelled by the fluid (9), for example gas of very high temperature, which enters via the inlet opening (10), this being the free space between the rotary circular wall (8) and the fixed lateral wall (25.1) of the main chamber (1). If the rotational velocity is high enough, a large portion of the solid particles, mainly the coarsest ones, separate from the gas under the effect of the centrifugal force and are repelled towards the rotary circular wall (8) and form an annular vortex, shown schematically by the arrows (151). Blades (39.2) fastened along the annular disc (113) may increase the centrifugal force and the swirling effect, if necessary.

The blades (114) that act as centrifugal compressor suck up the fluid (9.1), which is the result of the reaction between the solid particles (128) and the fluid (9), for example the result of the gasification of the biomass by the very high-temperature gas (9), and which entrains the other part of the solid particles, mainly the finest ones, for example the residues of the gasification that still contain a significant amount of carbon, in the rotary separating chamber (101). The passage between the rotary separating wall (130) and the rotary circular wall (8) may be narrow enough for the solid particles to acquire a sufficient longitudinal velocity to make them slide along the circular rotary wall (8) and along the guides (131) towards the delivery opening (27), which is the space between the rotary circular wall (8) and the fixed lateral wall (25).

The centrifugal force separates the fluid (29), which is sucked up by the device for discharging the fluid (5), from the delivered solid particles and fluid (15), which are sucked up by the finned wheel (13) into the main chamber (1).

An accumulation channel or throat (94.1) makes it possible to concentrate the delivered solid particles (15) so as to constitute a buffer between the rotary separating chamber (101) and the main chamber (1) and therefore to reduce the delivered fluid flow. To prevent delivery of a significant part of the fluid (9.1), another fluid, for example steam, may be fed via the tube (89.1) into the space between the finned wheel (13) and the fixed lateral wall (25) and/or along the accumulation channel (94.1), for example through a porous or perforated wall.

A fluid (3), for example a mixture of oxygen and steam, is fed into the main chamber (1) via the tube (83) through a feed device (54), for example a porous or perforated wall. This fluid may react with the delivered solid particles (15) that pass through the main chamber (1) and the fluid (9) resulting from this reaction, for example the very hot gas resulting from the combustion of the residual carbon, is sucked into the rotary reaction chamber (102) through the inlet opening (10).

Blades (39.1), fastened along the outer surface of the rotary circular wall (8), may generate a centrifugal force that repels the solid particles (4), for example ash, towards the accumulation channel or throat (94) where they can be discharged via the tube (84). The blades (39.1) are unnecessary if the rotary circular wall (8) is corrugated, which is desirable if this wall is exposed to a high temperature gradient, for example the temperature difference between the main chamber, where the combustion of the gasification residues takes place and where the temperature may exceed 1000° C., and the rotary chambers cooled by the energy consumed by the gasification, where the temperature may be below 500° C. This may also increase the area of contact for the solid particles that slide along the very hot rotary circular wall and therefore for heat transfer that may allow the reaction, for example the gasification reaction, to be extended inside the rotary separating chamber (101).

Suitable devices, such as packings, may protect the ball bearings (16.2) and (16.3). A fixed sleeve (160) may surround the rotary sleeve (133) and a fluid, for example steam, may be fed between the two sleeves via the tube (89) so as to prevent solid particles from entering the space. The ball bearing (16.3) may also be protected by the feeding of a fluid, through fixed hollow spokes (20) or through the driveshaft (12), if this is hollow.

An annular separating chamber (35) may recover the solid particles that have been entrained by the fluid (29), and a coolant may be injected into the rotary separating chamber (101) through a hollow driveshaft (12) or through the fixed central discharge tube (6.1) or (6.2).

This device may be used for other processes, such as for the two-step catalytic modification of a fluid. For example, the fluid to be modified may be fed into the main chamber (1) through the porous or perforated or slotted wall (54) and be modified by the catalyst that circulates in this chamber. Next, it may undergo a second modification in the rotary reaction chamber (102) upon contact with a fluid and/or with regenerated catalytic particles, which are fed via the tube or tubes (127), before being discharged through the rotary separating chamber (101).

For example, the catalytic conversion of middle olefins coming from cracking naphtha, the harnessing of which is difficult, requires regular regeneration of the catalyst, by an order of magnitude less than the catalytic cracking of heavy petroleum fractions, but by an order of magnitude greater than the requirements for regenerating the catalyst used for the conversion of light olefins coming from the light cracking gasolines. This device makes it possible to tap off, continuously via the tube or tubes (84), a portion of the catalyst circulating in the main chamber (1) towards the rotary reaction chamber (102) and to feed it back into this rotary chamber via the tube or tubes (127) after having been regenerated in an external regenerator. If this portion is substantial enough and if the temperature of these catalytic particles has been substantially increased in the external regenerator, the second phase of converting the olefins in the rotary reaction chamber may take place optimally at higher temperature and at lower pressure.

This device with an inner bladed wheel makes it possible to provide good continuous circulation of the solid particles along the rotary circular wall (8) and in the main chamber (1). It may also allow continuous regeneration of the catalyst in one of the chambers, either the main chamber or the rotary chamber, and conversion of a fluid in the other chamber, for example the conversion of ethylbenzene into styrene by oxidation-reduction requiring continuous regeneration of the catalyst. In this process, the ethylbenzene is dehydrogenated using a suitable catalyst and the hydrogen produced reduces the catalyst, which has been oxidized beforehand. This catalyst is then regenerated, that is to say oxidized in a regeneration chamber, for example with pure oxygen or oxygen mixed with steam.

The fluid to be converted, for example, ethylbenzene, may be fed via the tube or tubes (127) in place of the solid particles (128); the regeneration fluid (3), for example oxygen, may be fed via the tube or tubes (83) through the porous or perforated or slotted wall (54).

The shape of the blades and the fins may be adapted so that the centrifugal force is low enough in the rotary reaction chamber (102) to allow good fluidization of the catalyst entrained by the fluid (128) to be converted, while still having a rotational velocity of the rotary circular wall (8) high enough for the centrifugal force in the rotary separating chamber (101) to allow good separation of the delivered catalytic particles and fluid (15) from the converted fluid (29) discharged by the fluid discharge device (5).

The catalytic particles delivered by the finned wheel (13) into the main chamber (1) may be regenerated by the fluid (3), for example oxygen, fed via a porous wall (54), before being recycled into the rotary reaction chamber (102), the dimensions of which may be adapted to the residence time of the fluid suitable for its proper conversion.

Since catalytic particles may be entrained by the fluid (29), they may be replaced or recycled by a feed device, for example through a tube (89.1) or (127).

To prevent diffusion of the regeneration fluid into the rotary chambers and diffusion of the fluid to be converted or of the converted fluid into the main chamber (1) where they could react with the regeneration fluid, the main chamber, where the regeneration takes place, may be narrow and have circular accumulation channels (94) and (94.1) along its two lateral sides in order to form a buffer of fluidized catalytic particles. Separation fluids, for example steam, may be fed into these circular separating channels, for example via a porous wall, so as to fluidify the catalytic particles therein and to separate the main chamber from the rotary chambers by repelling the fluids coming from the rotary chambers.

To ensure good separation, it is desirable for the wheel (13) to enter the circular accumulation channel (94.1) and for an outer ring surrounding the rotary circular wall (8) close to the fixed lateral wall (25.1) to enter the circular accumulation channel (94).

Since this device has only a single central discharge tube (6.1), the fluids produced during the regeneration of the catalyst are mixed with the converted fluid. If it is necessary to separate them, a device having at least two central fluid discharge outlets has to be provided, such as for example that described in FIG. 19.

FIG. 19 is a schematic view of the longitudinal section of an example of a rotary chamber with centrifugal delivery, which is open and which is divided by a rotary separating wall (130), as in FIGS. 14 and 18, with a second fixed central discharge tube (6.3) located on the other lateral side. It is particularly suitable for the catalytic conversion of fluids by means of catalysts that have to be continuously regenerated, such as for example the cracking of light olefins.

The fluid to be converted, for example cracked gasoline olefins, may be fed via one or more tubes (83) through a porous or perforated or slotted wall (54) into the main chamber (1) where it is converted using the continuously circulating catalyst pushed by the centrifugal force generated by the finned wheel (13).

The catalytic particles and the converted fluid (9) then enter the rotary chamber (104) through the inlet opening (10), which is the space between the rotary circular wall (8) and the fixed central discharge tube (6.1). The blades (39) increase their rotational velocity so that the discharged fluid (29) separates from the catalytic particles that enter the rotary chamber (103) through the passage or passages between the rotary separating wall (130) and the rotary circular wall (8). In this example, this passage takes the form of a siphon (161) in which a separating fluid (3.2), for example steam, is fed via the hollow driveshaft (12) through the hollow rotary separating wall (130.1) so as to prevent a significant portion of the converted fluid from entering the rotary chamber (103).

The catalytic particles are then sucked up by the finned wheel (13) through the delivery opening (27), which is the space between the fixed lateral wall (25) and the rotary circular wall (8). In this example, the delivery opening (27) is preceded by the flaring of the rotary circular wall (8) close to the tubes (83.1), so as to form a rotary annular reaction zone (103.1) where the flow of catalytic particles can swirl under the influence of the fluid (3.1) for regenerating the catalyst, for example, oxygen fed via these tubes (83.1). This fluid (3.1) reacts with the catalytic particles, for example, it oxidizes the carbon deposited on the catalyst, and then (29.1) it is discharged via the fluid discharge device (5.1).

Before returning to the main chamber (1), the catalytic particles pass through the accumulation channel (94), which acts as a siphon in which a separating fluid (3.2), for example steam, is fed via the tube or tubes (83.2) through a porous or perforated or slotted wall (54) so as to fluidize the catalytic particles and prevent the regeneration fluid (3.1) from reacting with the fluid (3) to be converted.

All the examples of processes using particular diagrams or embodiments of the invention and the orders of magnitude described above and below are given merely by way of indication so as to illustrate various particular embodiments of the invention and their applications in various types of processes. They are not limiting. The same processes may use various particular diagrams and embodiments of the invention, and the same particular diagrams and embodiments of the invention may be applied to various processes. They may also be combined with one another.

EXAMPLES OF APPLICATION

1—Biomass Combustion:

By way of indication, a main cylindrical chamber (1) of small dimensions, similar to that of FIG. 6, with or without a compressor (62) and/or an impeller (65), for example 60 cm in diameter by 50 cm in height, i.e. a total volume of 140 liters, containing a rotary chamber with centrifugal delivery may be used. This main chamber is fed with solid particles of ground biomass and, for example, with 24 $m^3$ of air per minute. This makes it possible to burn, with about 50% excess air, about 1.5 kg of equivalent carbon per minute, which corresponds to a combustion capacity of 640 kg of carbon per $m^3$ per hour, i.e. about 6 MW, coming from about 2.5 tonnes of biomass. Most of the air, for example 20 $m^3$, may be fed through the fixed circular wall (54) perforated by a thousand holes 4 mm in diameter, distributed every 3 cm, with a gas injection velocity of about 25 m/s.

The rotary chamber may be cylindrical with blades similar to those of FIG. 3. The six blades (39) may have a height of 30 cm, an outer circumference (39.1) with a diameter of 30 cm and an inner circumference (39.2) with a diameter of 20 cm. The six inlet openings (10) in the rotary chamber have a length of 30 cm and a width of about 7 cm if their cross section is inclined at about 45°. This requires a mean inlet velocity of the burnt gases, the volume of which has been multiplied by about 5, of about 15 m/s, of which approximately 10 m/s tangential component is added to the rotational velocity of the blades. If the inside diameter (40.2) of the ring (40) is 25 cm, the longitudinal discharge velocity of the burnt gases is about 40 m/s.

If the rotary chamber rotates at 3000 revolutions per minute, the average centrifugal force exerted on the fluid entering the chamber is about 2000 times the gravitational force, thereby being sufficient to return most of the microparticles back to the outer wall, and if the outside diameter of the finned wheel (13) is 50 cm, its tangential peripheral velocity is about 80 m/s and the centrifugal force is about 2500 times the gravitational force over 10 cm more than the blades, this being sufficient to deliver a small portion of the burnt gases with the finest solid particles that were to enter the rotary tube.

If the disc (11) closing off the bottom of the rotary chamber has a diameter of 40 cm and is 5 mm from the lower wall of the chamber, its peripheral rotational velocity is 60 m/s and the radial feed velocity of 4 $m^3$ of air is about 11 m/s. The solid particles that accumulate between the two vortices, the upper one (15) formed by the delivered burnt gases and the lower one (61) formed by the 4 $m^3$ of fresh air fed in via the device (3), are highly agitated and can remain or return to the inside of the combustion chamber until their almost complete attrition. This constitutes very good combustion conditions.

If the outlet (84.2) is closed, the finest particles will accumulate until their size is small enough to be recuperated by the external device (35) and (86). If their accumulation is excessive (depending on the quality of the fuel), they may be discharged via the outlet (84.2). Scoria discharge may take place via the bottom (84.1) continuously or intermittently, and to prevent the formation of agglomerates, the percentage of the amount of fluid (3) fed along the disc (11) in the bottom of the chamber may be intermittently increased so as to increase their rotational velocity in order to break them up.

Fresh air (60) may be introduced into the driveshaft and passed through the disc (11) and/or the spokes (41), in order to pass through the blades (39), the rotary tube (8) and the wheel (13) and finally be injected into the main chamber (1) via the ends of the fins (14) so as to cool these elements, which are hollow.

The solid-particle combustion capacity of this device is related to the reaction velocity and therefore to the average size of the solid particles, until the limit is the burnt off gas discharge capacity. In this case, when it is no longer desirable to increase the diameter of the rotary chamber, it is still possible to reduce the ratio of the amount of gas to that of solid materials, by being content with partial combustion in the main chamber (1), the combustion possibly being completed in a second chamber serving as a boiler and/or to work in a combustion chamber provided with two outlets, as illustrated by FIG. 7.

It is also possible to work at a much higher pressure, for example with the aid of an external compressor or a centrifugal compressor (62), thereby enabling the air and biomass flowrate to be substantially increased. Some of the combustion energy may be recovered directly in an impeller (65) and the residual heat of the burnt gases (5.1) and (5.2) may be recovered in a boiler.

2—Manufacture of Syngas from Ground Biomass:

The diagram shown in FIG. 9 or 14 or 18 is used to bring carbonaceous solid particles, coming for example from a ground biomass fed via the tubes (87) or (127), into contact with partially oxidizing gas (9) at a very high temperature, for example more than 1000° C., but the oxidation capacity of said gas being an order of magnitude lower than the quantity of biomass to be gasified, so as to gasify all that can be gasified in a relatively short time in the rotary reaction chamber (102).

The gas mixture containing cokified residual solid particles is then transferred into the rotary separating chamber (101) between the guides (131), which increase its rotational velocity so as to separate it from the solid particles by the centrifugal force.

The centrifugal force separates the fluid mixture (29), which comes from the gasification and is discharged via the fixed central discharge tube (6.1), from the cokified residual solid particles (15) that are delivered by the finned wheel (13) into the main circular chamber (1).

An oxidizing gas (3), for example a mixture of steam and pure oxygen, the oxidation capacity of which is substantially greater than the residual amount of carbon to be oxidized, contained in the cokified solid particles (15), is fed into the main chamber (1) through the device (54) so as to oxidize them. This reaction permits the gas (3) to be heated to the desired temperature before entering the rotary chamber (102), and the ash (4.1) can be accumulated by the centrifugal force in the circular accumulation channel (94) and is discharged via the tube (84).

A coolant (58), for example water or steam, is fed between the two walls of the rotary chamber, via the hollow driveshaft (12) or (12.1), so as to cool the walls and then, for example after evaporation, be injected into the main chamber (1) via the openings (135) in the hollow blades (39) of FIG. 11. It may also be injected through the openings (136) in order to suddenly cool the fluid mixture (29) containing the syngas.

In the diagram shown in FIG. 18, the rotary walls are not cooled, in so far as this type of device may have a robust construction that withstands very high temperatures. For example, the rotary circular wall may be corrugated, so as to better distribute the expansion and improve the heat transfer between the main chamber at very high temperature and the rotary chambers, which are much less hot.

By way of indication, to illustrate the orders of magnitude, a cylindrical industrial reactor working at atmospheric pressure, 3.4 m in diameter by 2.2 m in height, i.e. a volume of about 20 m$^3$, containing a rotary chamber 2.8 m in diameter, the gasification chamber (102) of which has a height of 1.5 m, giving it a volume of about 9 m$^3$, may be used.

A volume of 0.1 m$^3$ per second of a fluid, which may for example be air, pure oxygen or steam, containing 20 kg of biomass, i.e. 72 tonnes per hour, containing 25% carbon, i.e. 5 kg/s, may be introduced into the gasification chamber (102) via the tube serving as driveshaft (12) having an inside diameter of about 10 cm or via a tube (127) through the fixed lateral wall (25.1).

This biomass is mixed for example with a volume of about 50 m$^3$/s of about 12 kg/s of burnt gases (9) heated to about 1000° C. and also containing the equivalent of 1.8 kg/s of oxygen, so as to gasify it. After gasification, it is possible to obtain for example about 16% of solid gasification residues, i.e. about 3.2 kg/s, still containing 25% of carbon, i.e. 0.8 kg/s, and about 70 m$^3$/s of a gas mixture (29) containing the syngas, for example at 500° C.

The carbon-containing gasification residues (15) are separated from the fluid (29) in the rotary separating chamber (101) and are delivered by the finned wheel (13) into the main chamber (1). They are burnt therein by a mixture of pure oxygen and steam, for example containing 4 kg/s of oxygen, of which an excess of about 1.8 kg/s remains, which is sent with the fluid (9) into the gasification chamber (102) where they can oxidize about 10% of the carbon contained in the biomass. The amount of steam is determined by the desired temperature. This is for example 7.2 kg/s, thereby giving about 12 kg/s of gas (9) or about 50 m$^3$/s at 1000° C.

To separate the mass of non-gasified solid particles from the gas (29), which is sucked up by the fluid discharge device (5), the centrifugal force must be high enough. This is obtained by the rotation speed of the chamber, for example 10 revolutions/second, corresponding to a tangential velocity of 88 m/s, generating a centrifugal force of about 560 times the gravitational force.

The separating power of the separating chamber also depends on its length. If this is 0.5 m, the average radial velocity of the fluid (29) is about 16 m/s, this being sufficient to entrain the finest particles, of the order of magnitude of 1 micron, in the fixed central discharge tube (6.1), despite the centrifugal force being 560 G. They must therefore be separated and recovered in the cyclone (35). The rotational velocity and the flowrate of gas and biomass may be adjusted so as to limit the amount of solid particles entrained by the fluid (29).

If the cross section of the inlet opening or openings (10) is 1 m$^2$, which corresponds to a space between the rotary circular wall (8) and the fixed lateral wall (25.1) of 12 cm, the inlet velocity of the hot gas (9) is about 50 m/s, which is sufficient to entrain the biomass particles in the rotary chamber (102) in a swirling movement and to form therein a swirling annular fluidized bed, the density of which depends on the flowrate of the gas, on the size of the solid particles and on the average centrifugal force inside the gasification chamber.

The residence time of the solid biomass particles, which depends on the concentration of these solid particles in the gasification chamber and therefore on the centrifugal force and on their size, must be long enough to allow them to be gasified. Suitable deflectors, such as for example a ring (134) or an inner wheel (113) and blades (39.2), may easily generate a centrifugal force sufficient to maintain the coarsest solid particles therein for the time needed to gasify them completely, which may optionally exceed one minute.

The average residence time of the syngas in the gasification chamber is only about 0.2 seconds, which may promote the production of unstable intermediates, possibly serving as active and utilizable raw materials, but requiring rapid cooling, which may be accomplished on its entering the separating chamber by spraying an appropriate coolant thereinto, for example, fine water droplets.

3—Polymerization of Catalytic Solid Particles:

The diagram of FIG. 7 is very suitable for the polymerization and copolymerization of catalytic solid particles. This is because the smaller the size of the catalytic particles, the higher the rate of polymerization and therefore also the flowrate of fresh and recycled monomer, which generally serves as coolant. It is therefore necessary to prevent the very high fluid flowrate from entraining the smallest catalytic particles, while still ensuring sufficient agitation of the polymerized particles that progressively become heavier and heavier.

Micro metric-scale catalytic particles may be introduced via the tube (82.2) into the main chamber (1.3). These particles firstly circulate in swirling motion in this chamber. They will be progressively polymerized and therefore become heavier.

The lightest particles may be entrained by the fluid inside the rotary chamber (103) and delivered, by the centrifugal force, via the finned wheel (13) into the main chamber (1.3). The heaviest particles concentrate along the circular wall (54) and are progressively transferred by the passage, which is preferably narrow, between the rotary separating disc (11.1) and the fixed circular wall (54), towards the main chamber (1.4) where they circulate, again swirling while still continuing to be polymerized. They are finally discharged via the tube (84.1).

The dimensions of the two parts of the main chamber (1.3) and (1.4) and of the rotary chamber (103) and (104), together with the fluid flowrate, may be adapted to the size of the solid particles, which is smaller in the upper part. For example, the length and/or the diameter of the lower main chamber (1.4) may be larger as it contains the coarsest particles, the catalytic activity of which is generally reduced. The composition, the flowrate and the temperature of the fluids may also be different therein, depending on the polymerization objectives.

The fluids discharged (5.1) and (5.2) may be recycled after suitable treatment, for example after being cooled, into the same main chambers and, if the rotary chamber is equipped with two walls, some of this fluid and/or the fresh fluid may serve to cool the hollow walls of the rotary chamber by passing through the hollow driveshaft and/or may be injected via the edge of the separating disc (11.1) and/or the fins (14) and (14.1).

If the main fluid is a gas, it is possible to spray a liquid into one of the chambers, passing via the hollow driveshaft and the hollow spokes (41). This liquid may be a comonomer or a coolant.

4—Catalytic Modification of a Fluid

The diagrams of FIGS. 3, 6, 7 and 17 may also serve for the catalytic modification of a fluid, for example the hydrogenation, dehydrogenation or cracking of the molecules of a fluid, the solid particles suspended in the fluid serving as catalyst. These solid particles may be discharged continuously and recycled after suitable treatment. The finest particles may also be discharged separately, for example in order to remove them.

In the diagram of FIGS. 7 and 17, the fluid discharged from a main chamber, for example (1.4), may be recycled into the other main chamber (1.3).

The diagrams of FIGS. 18 and 19 also illustrate the possibility of continuously regenerating the catalytic particles in the main chamber or in a rotary chamber.

5—Impregnation or Coating of Microparticles with Nanoparticles:

The diagram of FIG. 12 may be used to impregnate or coat microparticles with nanoparticles.

Agglomerates of microparticles (128) may be fed through the fixed lateral wall (25.1) via the tubes (127) into the rotary chamber (102). They (15) are sucked up through the rotary chamber (101) by the finned wheel (13) and delivered into the main chamber (1). The turbulence generated by the finned wheel and the Coriolis acceleration is normally sufficient to break up the agglomerates of microparticles.

The device of FIG. 13 is used to break up the agglomerates of nanoparticles using a powerful jet of gas before they are fed via the tube (125) into the main chamber (1) where they encounter the turbulent flow of microparticles, comprising active sites on which they can be attached.

One portion of the microparticles concentrates under the effect of the centrifugal force in the accumulation channel (94), where they can be discharged via the tube (84.1), and the other portion returns to the chamber (102) via the inlet opening (10). The continuous circulation of microparticles is provided by the finned wheel (13) that acts as a centrifugal compressor.

The device (5) enables the gas (29) to be sucked up through the openings (147) of the hollow driveshaft (12) and of a filter (138) so as to maintain a constant pressure in the reactor. The centrifugal force and appropriate deflectors (139) ensure that the microparticles are separated from the discharged gas (29).

The process may operate in batch mode. Firstly, the reactor is fed with microparticles (128) via the tube (127) and progressively filled with microparticles that circulate between the chambers (102), (101) and (1), the gas being discharged by the device (5). When the amount of microparticles is sufficient, the feed is interrupted and the device of FIG. 13 starts to feed nanoparticles via the tube (125), the gas being discharged by the device (5). This feed is interrupted when the microparticles are sufficiently impregnated. The correctly impregnated microparticles are then discharged via the tube (84.1).

This batch operation may ensure a relatively homogeneous impregnation over a period long enough to limit the flowrate of the fluid (29) to be discharged and therefore limit the risks of the solid particles being entrained with the fluid (29). However, all of these operations may be carried out continuously, if it is necessary to have a high throughput.

By way of indication, to illustrate the orders of magnitude, an industrial reactor, the main chamber of which is slightly conical, with a height of 1 m and a diameter of 2 m at its top and 1.6 m at its bottom, respectively, with a rotary chamber 1.4 m in diameter, a finned wheel of 1.95 m diameter, rotating at a speed of 20 revolutions per second may be used. The centrifugal force along the rotary circular wall and at the end of the finned wheel is about 1000 and 1400 times the gravitational force respectively, which is normally sufficient to break up the microparticles.

The reactor is firstly fed via the tube (127) with a fluid (128) containing for example 20% of microparticles with a flowrate of 1.2 $m^3$/min for one minute, thereby making it possible to fill the main chamber, the space around the finned wheel and a layer of about 5 cm in thickness along the circular wall, which represents a volume of about 1.2 m³ with an average microparticle concentration of 20%.

During this period, the fluid discharge device (5) must discharge about 1.2 m³ of gas so as to maintain the pressure in the reactor. If the particulate filter has a diameter of 0.7 m, the radial velocity of the gas passing through it is less than 1 cm/s this being insufficient to entrain the microparticles repelled by a centrifugal force 1000 times the gravitational force.

If the shape and the dimensions of the blades (39), of the fins (14) and of the delivery openings (27) allow circulation of the gas and the microparticles, for example 80 l/s, the flow passing between the guides (131) is 100 l/s, requiring an average longitudinal velocity of about 0.5 m/s if the thickness of the passage along the guides is 5 cm.

During a second period, the microparticle feed is replaced by a 1.2 $m^3$/min feed of a gas injected at a velocity of about 300 m/s through an injector 9 mm in diameter, making it possible to break up and feed into the fixed annular chamber, through the tube (125), for example 1.2 liters of nanoparticles per minute, during the time needed to feed the desired amount of nanoparticles, for example in one minute. During this period, the nanoparticles may be attached, relatively uniformly, onto the active sites of the microparticles that circulate, by rotating in a turbulent manner, between the main chamber and the rotary chamber and make on average four revolutions around the rotary circular wall (8).

During this period, the fluid discharge device (5) discharges the 1.2 $m^3$ of gas fed via the tube (125) without entraining the nanoparticles, which are attached onto the microparticles, nor the microparticles because of the very high centrifugal force.

During a third period, the two feeds are stopped and the microparticles, impregnated or coated with the nanoparticles, are discharged via the tube (84), which may be located on the side facing the finned wheel if the process operates in batch mode. During this period, gas must be fed by the inverted fluid discharge device (5) through the filter (138), which may thus be stripped of the microparticles that it would have stopped.

These numbers are merely orders of magnitude and this process of impregnating microparticles with nanoparticles may operate continuously. However, in this case it is preferable to use an arrangement in a double main chamber, for example similar to the diagram of FIG. 17, so as to extend the travel of the microparticles in order to improve the homogeneity of their impregnation.

In this case, the microparticles may be fed into the rotary chamber (103) via a tube passing through the fixed lateral wall (25.1) facing the inlet opening (10) and be discharged via the tube (84) after having circulated in succession in the main chambers (1.3) and (1.4). The fluid feed device (54) may be replaced by devices for feeding nanoparticles by tubes (125) as described in FIG. 13.

The shape and dimensions of the rotary and main chambers and of the fixed central discharge tubes may be adapted to the specific requirements of this application.

The invention claimed is:

1. A device for discharging a fluid comprising:

a main chamber adapted to receive a fluid and containing solid particles fluidized by the fluid through a rotary chamber, wherein the rotary chamber is bounded by a rotary circular wall, surrounding and rotating about a rotation axis disposed within the main chamber and connected to a rotation device for rotating the rotary circular wall and comprising:

at least one inlet opening disposed through at least one wall, enabling the fluid to enter the rotary chamber;

blades disposed along the rotary circular wall for rotating the fluid and the solid particles entrained by the fluid into the rotary chamber;

at least one central outlet opening around the rotation axis adapted to discharge the fluid from the rotary chamber;

at least one fixed central discharge tube, the discharge opening of which communicates with the central outlet opening of the rotary chamber;

at least one fixed wheel fixed around and on the outside of the rotary circular wall; and at least one delivery opening along the rotary circular wall enabling the fluid and the solid particles running along said rotary circular wall inside said rotary chamber to enter the space located between said fins and to be delivered into said main chamber by centrifugal force when the device is operating.

2. The device of claim 1, wherein the rotary chamber comprises:

at least one rotary separating wall dividing the rotary chamber into two parts communicating with each other via at least one passage disposed along said rotary circular wall; and at least one bladed inner wheel disposed inside said rotary chamber comprising:

an annular disc, the outer edge or which is fastened along the inner surface of said rotary circular wall and said blades of which are fastened to and run along said rotary separating wall and said inner wheel.

3. The device of claim 1, wherein the at least one finned wheel is disposed on a first side of said rotary chamber and the at least one inlet opening is located on a second side of the rotary chamber, at least one finned wheel is disposed on both the first side and the second side of said rotary chamber and the at least one inlet opening is disposed through a middle of the rotary chamber or the at least one finned wheel is disposed within a middle of the rotary chamber or the at least one finned wheel is disposed within a middle of the rotary chamber and at least one inlet opening is disposed in both the first side and the second side of the rotary chamber.

4. The device of claim 1, wherein said main chamber and said rotary chamber are divided into at least two parts, the outer edge of which is larger than said rotary circular wall and smaller than said fixed circular wall of said main chamber.

5. The device of claim 1, wherein said main chamber comprises a solid-particle feed device and a solid-particle discharge device.

6. The device of claim 1, wherein said at least one inlet opening is bounded by blades between which said fluid entering said rotary chamber can pass.

7. The device of claim 1, wherein said rotary chamber has at least one larger cross section located on the side of said finned wheel.

8. The device of claim 1, wherein a said fixed central discharge tube is divided into two sections separated by an annular chamber, which is connected to a device for discharging the solid particles that have accumulated along the lateral wall of said annular chamber by the centrifugal force.

9. The device of claim 1, wherein said main chamber is circular and the circular wall includes many openings for injecting a fluid in a direction having a component perpendicular to the radial direction.

10. The device of claim 1, which comprises a device for feeding solid particles through at least one fixed tube, the outlet of which is located facing said inlet openings enabling said solid particles to be fed directly into said rotary chamber through said inlet openings.

11. The device of claim 1, wherein said fluid is in the gaseous state and the device further comprises a device for spraying droplets of a liquid through a tube chosen from a fixed tube, the outlet of which is located facing said inlet openings of said rotary chamber, and a rotary tube entering said rotary chamber, enabling said droplets of said liquid to be sprayed directly into said rotary chamber.

12. The device of claim 1, further comprising a device for feeding solid nanoparticles into the main chamber using a fluid jet.

13. The device of claim 1, wherein said main chamber is a fluidized-bed reactor, said fixed central discharge tube being the outlet tube for the fluid fed into said reactor, and said rotary chamber and said finned wheel being placed close to the upper wall of said reactor.

14. The device of claim 1, wherein the upper part of said reactor is wider and includes a lateral wall comprising many openings via which a fluid can be injected in a direction whose main component is downwardly directed.

15. A device for discharging a fluid comprising:
a main chamber adapted to receive a fluid and containing solid particles fluidized by the fluid through a rotary chamber, wherein the rotary chamber is bounded by a rotary circular wall, surrounding about a rotation axis disposed within the main chamber and connected to a rotation device for rotating the rotary circular wall and comprising:
at least one inlet opening disposed through at least one wall, enabling the fluid to enter the rotary chamber;
blades disposed along the rotary circular wall for rotating the fluid and the solid particles entrained by the fluid into the rotary chamber;
at least one central outlet opening around the rotation axis adapted to discharge the fluid from the rotary chamber;
at least one fixed central discharge tube, the discharge opening of which communicates with the central outlet opening of the rotary chamber;
at least one fixed wheel fixed around and on the outside of the rotary circular wall; and
at least one delivery opening along the rotary circular wall enabling the fluid and the solid particles running along said rotary circular wall inside said rotary chamber to enter the space located between said fins and to be delivered into said main chamber by centrifugal force when the device is operating.

* * * * *